United States Patent
Paoline

(10) Patent No.: US 11,977,727 B1
(45) Date of Patent: May 7, 2024

(54) METHOD FOR SYNCHRONIZING A VIRTUAL REMOTE DISPLAY SCREEN OF AN APPLICATION EXECUTING ON A HARDWARE DEVICE WITH A PHYSICAL REMOTE DEVICE AND USING THE DISPLAY SCREEN AND REMOTE DEVICE TO RECORD INFORMATION REGARDING HUMAN BEHAVIOR

(71) Applicant: SCRIBE SUPPORT SERVICES, LLC, Bensalem, PA (US)

(72) Inventor: Joseph A. Paoline, Trenton, NJ (US)

(73) Assignee: SCRIBE SUPPORT SERVICES, LLC, Bensalem, PA (US)

( * ) Notice: Subject to any disclaimer, the term of this patent is extended or adjusted under 35 U.S.C. 154(b) by 0 days.

(21) Appl. No.: 17/994,691

(22) Filed: Nov. 28, 2022

Related U.S. Application Data

(60) Provisional application No. 63/283,743, filed on Nov. 29, 2021.

(51) Int. Cl.
| | |
|---|---|
| G06F 3/04847 | (2022.01) |
| G06F 3/023 | (2006.01) |
| G06F 3/0481 | (2022.01) |
| G06F 3/04842 | (2022.01) |
| G06F 9/451 | (2018.01) |

(52) U.S. Cl.
CPC .......... *G06F 3/04847* (2013.01); *G06F 3/023* (2013.01); *G06F 3/0481* (2013.01); *G06F 3/04842* (2013.01); *G06F 9/451* (2018.02)

(58) Field of Classification Search
CPC .... G06F 3/04847; G06F 3/023; G06F 3/0481; G06F 3/04842; G06F 9/451
See application file for complete search history.

(56) References Cited

U.S. PATENT DOCUMENTS

| | | | | |
|---|---|---|---|---|
| 5,956,667 | A * | 9/1999 | Higginbotham | G06F 40/10 340/4.1 |
| 9,299,262 | B2 | 3/2016 | Hill | |
| 9,813,768 | B2 * | 11/2017 | Chow | H04N 21/47205 |
| 10,048,923 | B2 * | 8/2018 | Hawver | G06F 9/485 |
| 2006/0046238 | A1 * | 3/2006 | DeGregory | G09B 7/02 434/350 |
| 2012/0209654 | A1 * | 8/2012 | Romagnino | G16H 40/20 705/7.27 |
| 2015/0302760 | A9 | 10/2015 | Behrmann | |
| 2020/0074158 | A1 * | 3/2020 | Kim | G06V 40/20 |
| 2022/0124191 | A1 * | 4/2022 | O'Leary | G06F 3/04817 |

OTHER PUBLICATIONS

Fortune Tech Universal Wireless VR Remote & Gamepad User Manual, Fortune Group. Downloaded from: http://www.fortunegrouponlineplaza.com/VR%20Remote%20Manual%20instruction.pdf, download date: Nov. 22, 2021, original posting date: unknown, 6 pages.

* cited by examiner

*Primary Examiner* — Phenuel S Salomon
(74) *Attorney, Agent, or Firm* — Panitch Schwarze Belisario & Nadel LLP

(57) ABSTRACT

A virtual remote display screen of an application executing on a hardware device is synchronized with a physical remote input device to allow a user to record information regarding human behavior for a program. The synchronization allows the information regarding human behavior to be recorded during a session by using either the virtual remote display screen or the physical remote input device, or a combination of both the virtual remote display screen and the physical remote input device.

17 Claims, 64 Drawing Sheets

View Logs

Edited By: Joey Paoline

Edited On: Oct 14, 2021 08:00:24

| Start Time | End Time | Occured |
|---|---|---|
| 11:52:34 | 11:57:34 | Yes |

Figure 13

| Back | Behavior ( Self Injury ) |
|---|---|

| Client Name | Lou Willis |
|---|---|
| Session | Self Injury - Head Banging |
| Measurement | Count - Weekly |
| Staff | Joey Paoline |
| Description | Everytime Lou makes contact with his head to his desk, the behavior worker will track each instance of head banging. |
| Future Note | |
| Next Schedule | Oct 27, 2021 09:30:00 |

Previous Session

Oct 27, 2021 09:35:07

Start Time: Oct 27, 2021 09:35:07

| From | Behavior | | |
|---|---|---|---|
| 09:35:13 | Head Banging | | |
| 09:35:51 | Head Banging | | |
| Total Count | | | 2 |

End Time: Oct 27, 2021 09:36:02

Task Analysis

Oct 27, 2021 11:47:54

Start Time: Oct 27, 2021 11:47:54

| Steps | From | To | Status |
|---|---|---|---|
| Put clothes into washer ( Lou will separate clothes for lights and darks and put either light or dark into wash. ) | 11:47:54 | 11:48:02 | Indpt |
| Pour in detergent ( Lou will pour in a cup of detergent ) | 11:48:02 | 11:48:08 | Prmtd |
| Turn on and start wash ( Lou will power on and start wash ) | 11:48:08 | 11:48:12 | Prmtd |
| Wait for wash ( Lou will wait 30 minutes for wash to finish. ) | 11:48:12 | 11:48:15 | Indpt |
| Remove wash and put wash into dryer ( Lou will transition wash into dryer ) | 11:48:15 | 11:48:16 | Prmtd |
| Total Time | 00:00:21 | Total Count | 2/5 |

Figure 45

Flowchart 1.0:

Flowchart 1.0:

Flowchart 1.0:

Flowchart 2.0

Flowchart 3.0

| Type | Program | Date Started |
|---|---|---|
| Behavior | Non compliance | 07/26/2022 |
| Behavior | Property Destruction | 07/26/2022 |
| Skill Trial | Intraverbals | 07/27/2022 |
| Skill Trial | Match to Sample: Categories | 07/26/2022 |
| Skill Trial | LRFFC: fill ins | 07/26/2022 |
| Skill Trial | Mand full sentence | 07/26/2022 |

METHOD FOR SYNCHRONIZING A
VIRTUAL REMOTE DISPLAY SCREEN OF
AN APPLICATION EXECUTING ON A
HARDWARE DEVICE WITH A PHYSICAL
REMOTE DEVICE AND USING THE
DISPLAY SCREEN AND REMOTE DEVICE
TO RECORD INFORMATION REGARDING
HUMAN BEHAVIOR

CROSS-REFERENCE TO RELATED
APPLICATIONS

This application claims the benefit of U.S. Provisional Patent Application No. 63/283,743 filed Nov. 29, 2021, the entire disclosure of which is incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Behavior tracking is generally a highly manual process wherein data regarding tracked humans are recorded on paper, such as worksheets, and then reviewed by trained professionals to determine an appropriate assessment. Various automated processes have been developed to improve the efficiency in collecting and analyzing tracked behavior. See, for example, U.S. Pat. No. 9,299,262 (Hill) and U.S. Patent Application Publication No. 2015/0302760 (Behrmann et al.). However, many situations exist where the person in charge of tracking the human requires significant flexibility regarding the recordation process of the tracked behavior and such systems fail to offer the needed flexibility.

The present invention fulfills such a need by providing a highly flexible approach using a combination of hardware and physical devices.

BRIEF SUMMARY OF THE INVENTION

A virtual remote display screen of an application executing on a hardware device is synchronized with a physical remote input device to allow a user to record information regarding human behavior for a program. The synchronization allows the information regarding human behavior to be recorded during a session by using either the virtual remote display screen or the physical remote input device, or a combination of both the virtual remote display screen and the physical remote input device.

BRIEF DESCRIPTION OF THE DRAWINGS

Preferred embodiments of the present invention will now be described by way of example with reference to the accompanying drawings:

FIG. 5-25 are user interface display screens in accordance with preferred embodiments of the present invention.

FIGS. 31-46 are additional user interface display screens in accordance with preferred embodiments of the present invention.

FIGS. 52-64 are additional user interface display screens in accordance with preferred embodiments of the present invention.

DETAILED DESCRIPTION OF THE
INVENTION

Certain terminology is used herein for convenience only and is not to be taken as a limitation on the present invention.

The words "a" and "an", as used in the claims and in the corresponding portions of the specification, mean "at least one."

This patent application includes an Appendix having a file named appendix689694-1U1.txt, created on Nov. 21, 2022, and having a size of 656,820 bytes. The Appendix is incorporated by reference into the present patent application. One preferred embodiment of the present invention is implemented via the source code in the Appendix. The Appendix is subject to the "Copyright Notice and Authorization" stated above.

Figure 5:
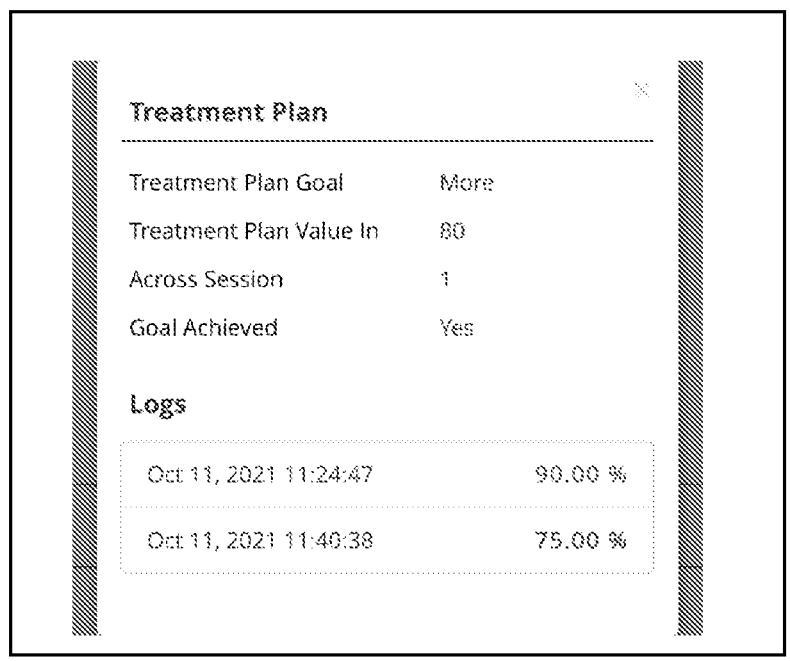
Figure 6:
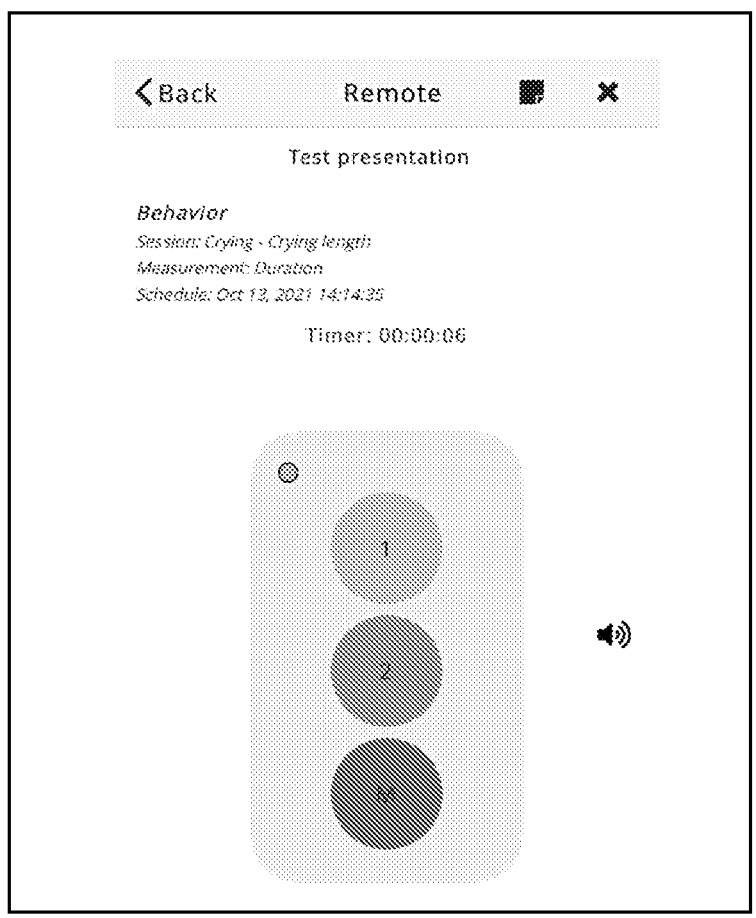
Figure 7:
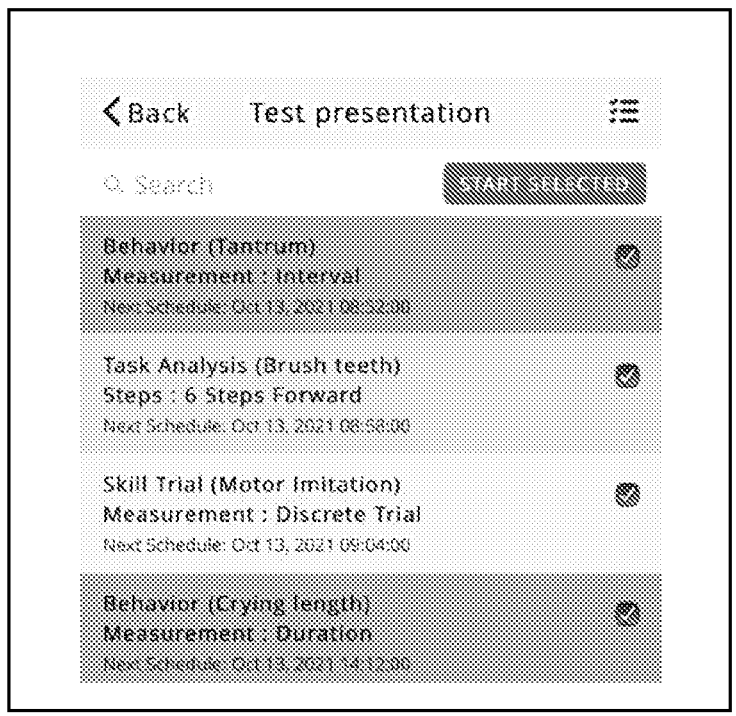
Figure 8:
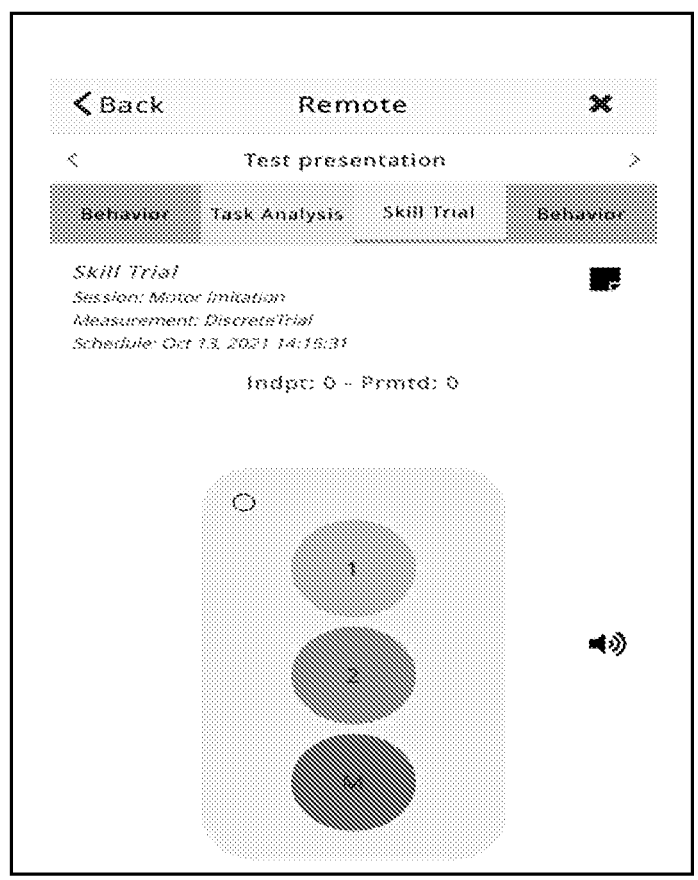
Figure 9:
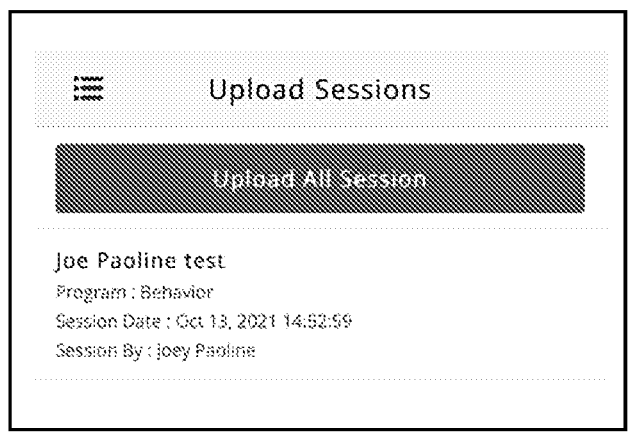
Figure 14:
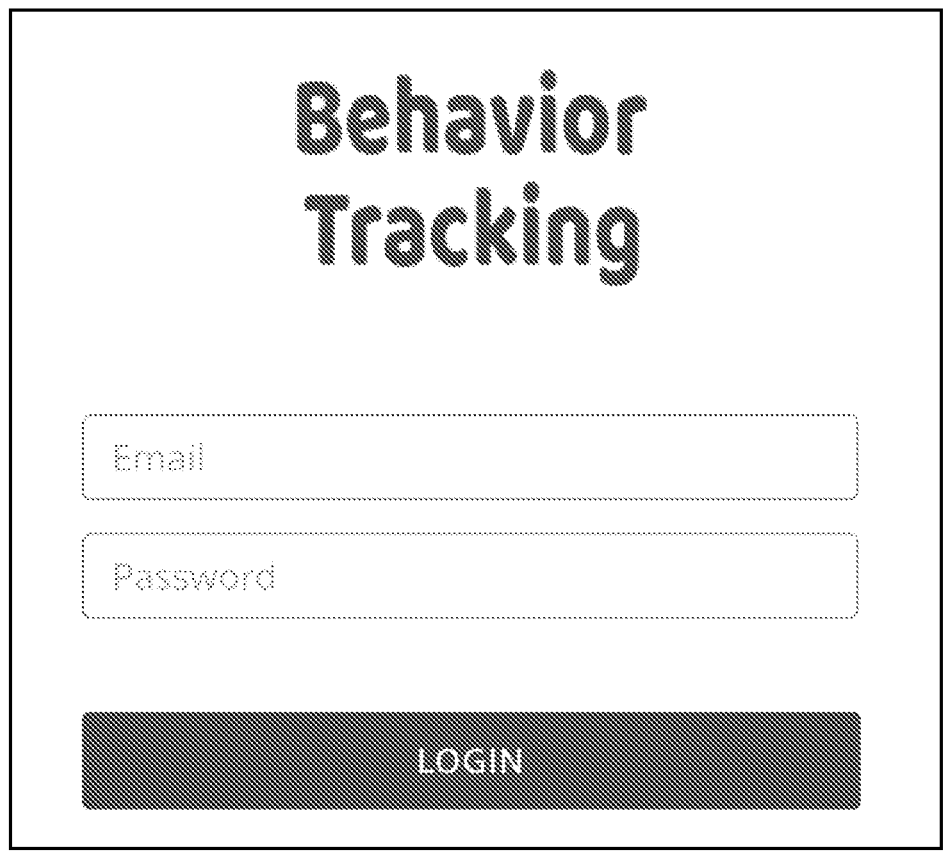
Figure 15:
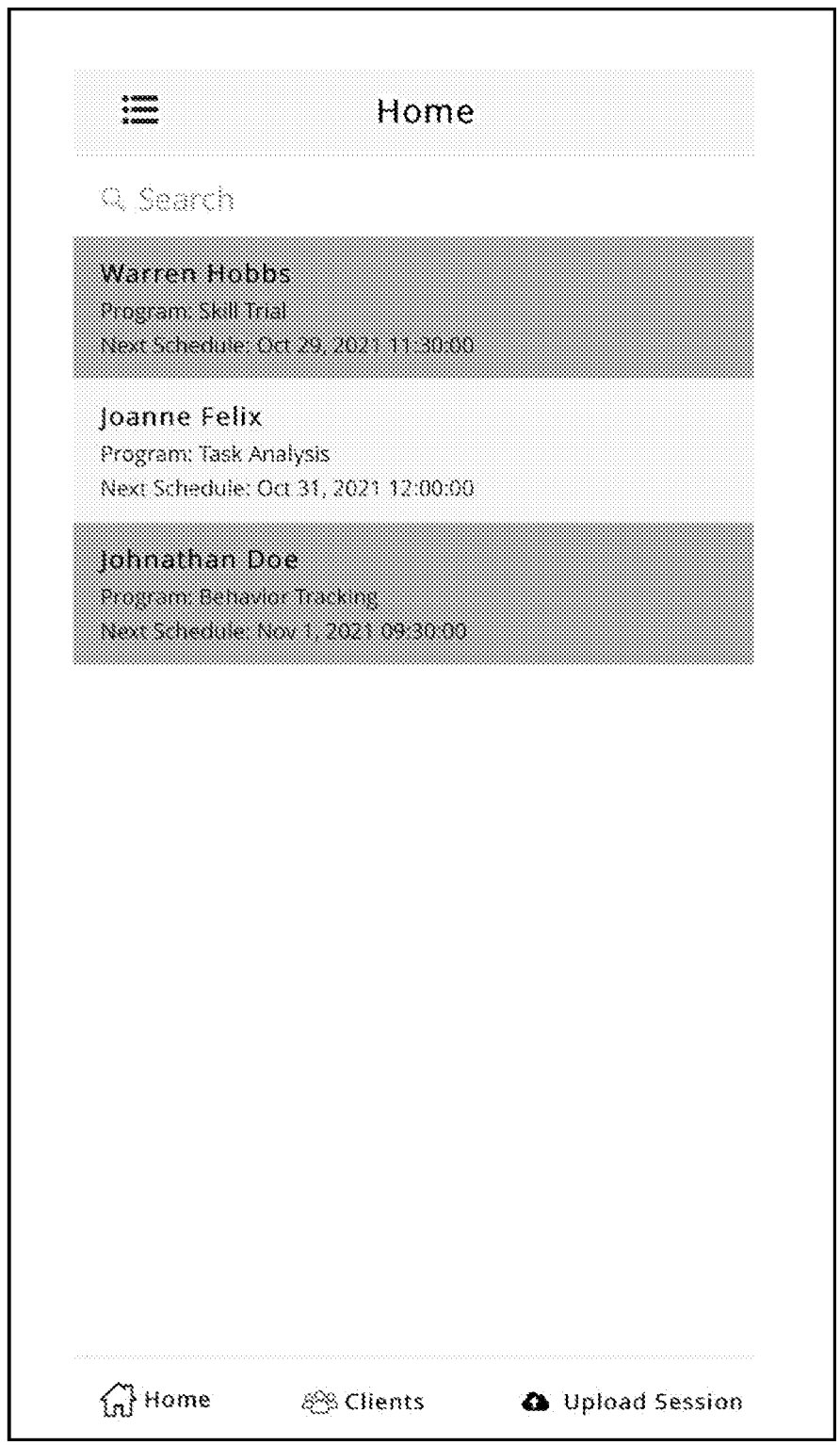
Figure 16:
Figure 17:
Figure 18:
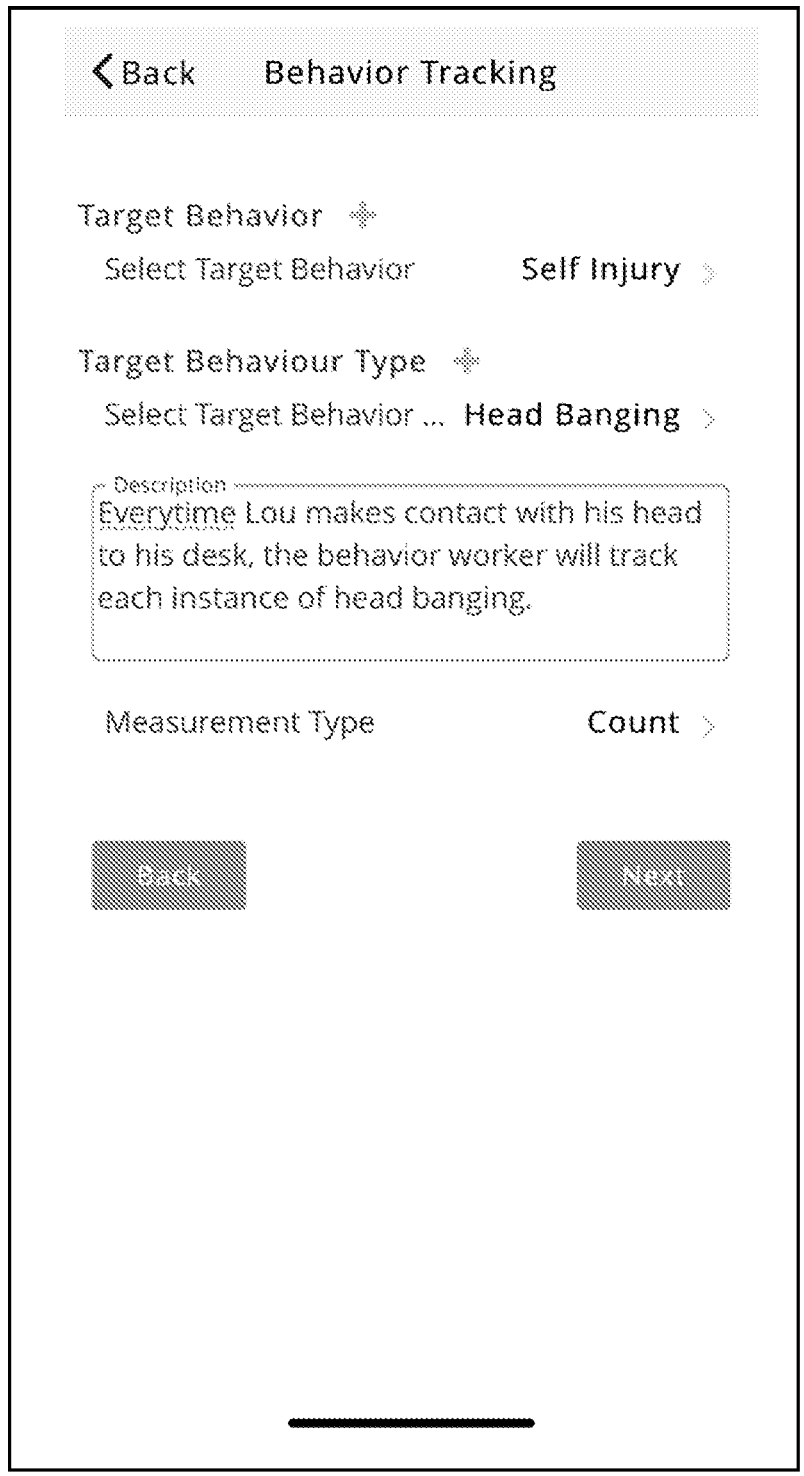
Figure 19:
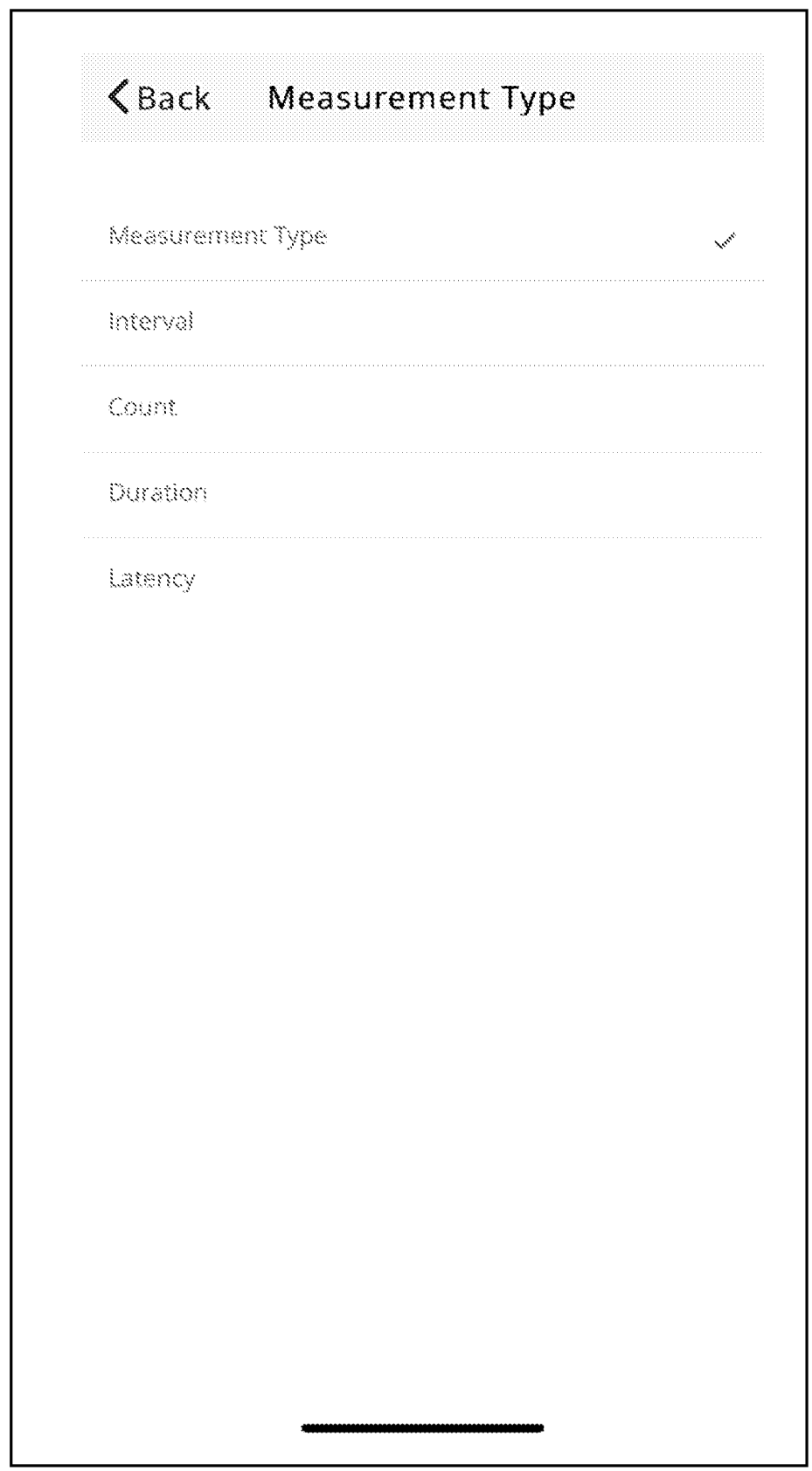
Figure 20:
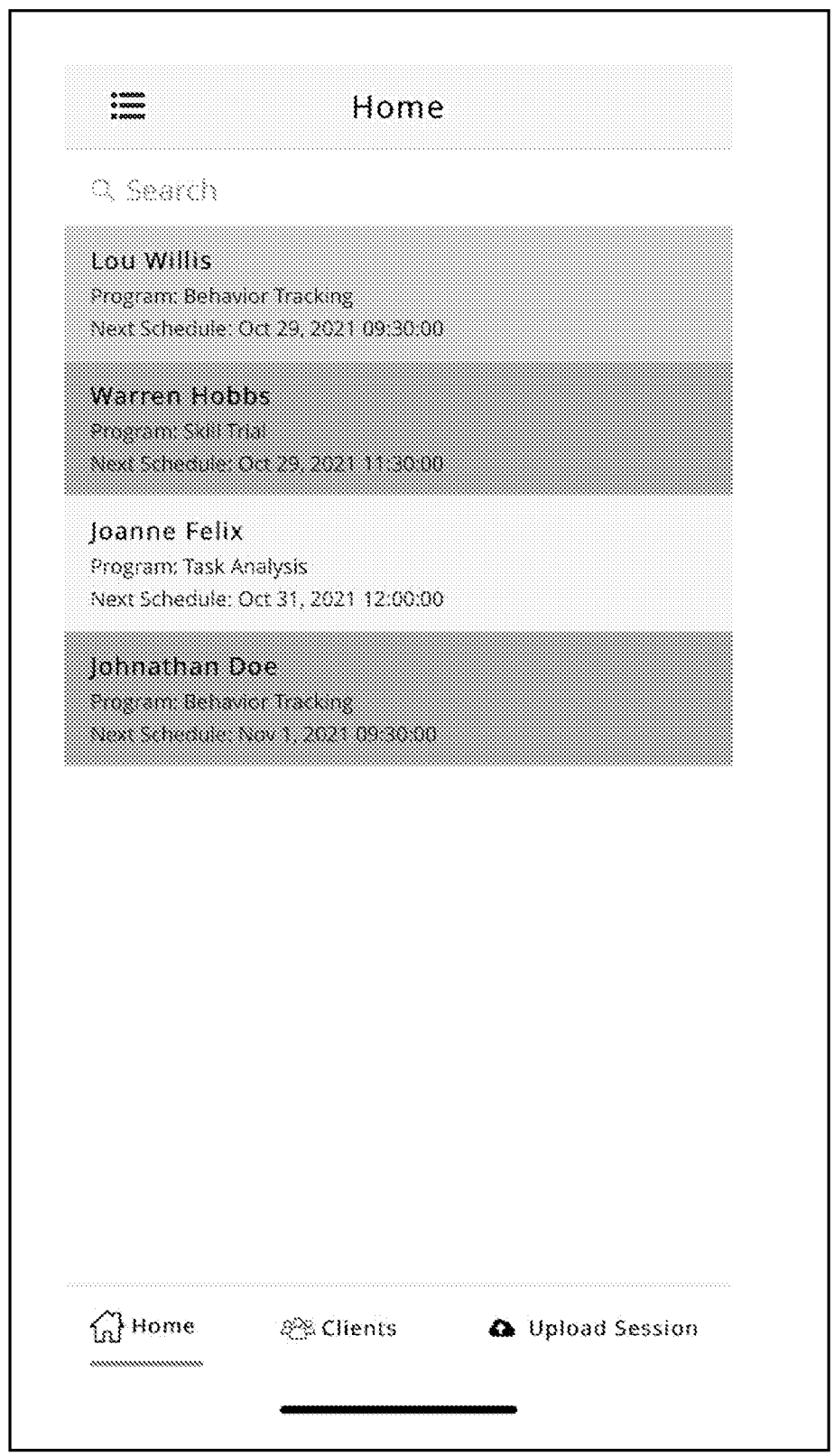
Figure 21:
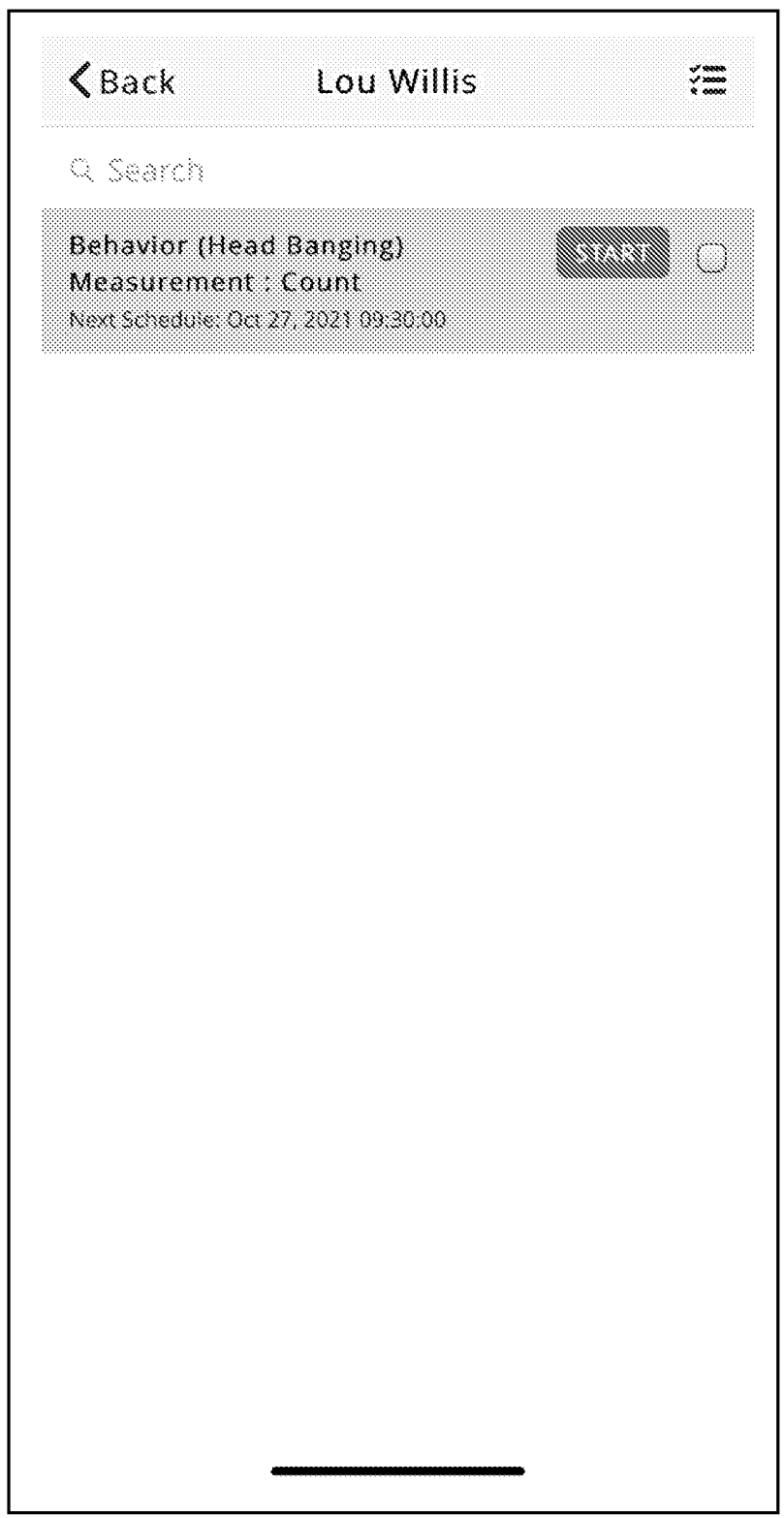
Figure 22:
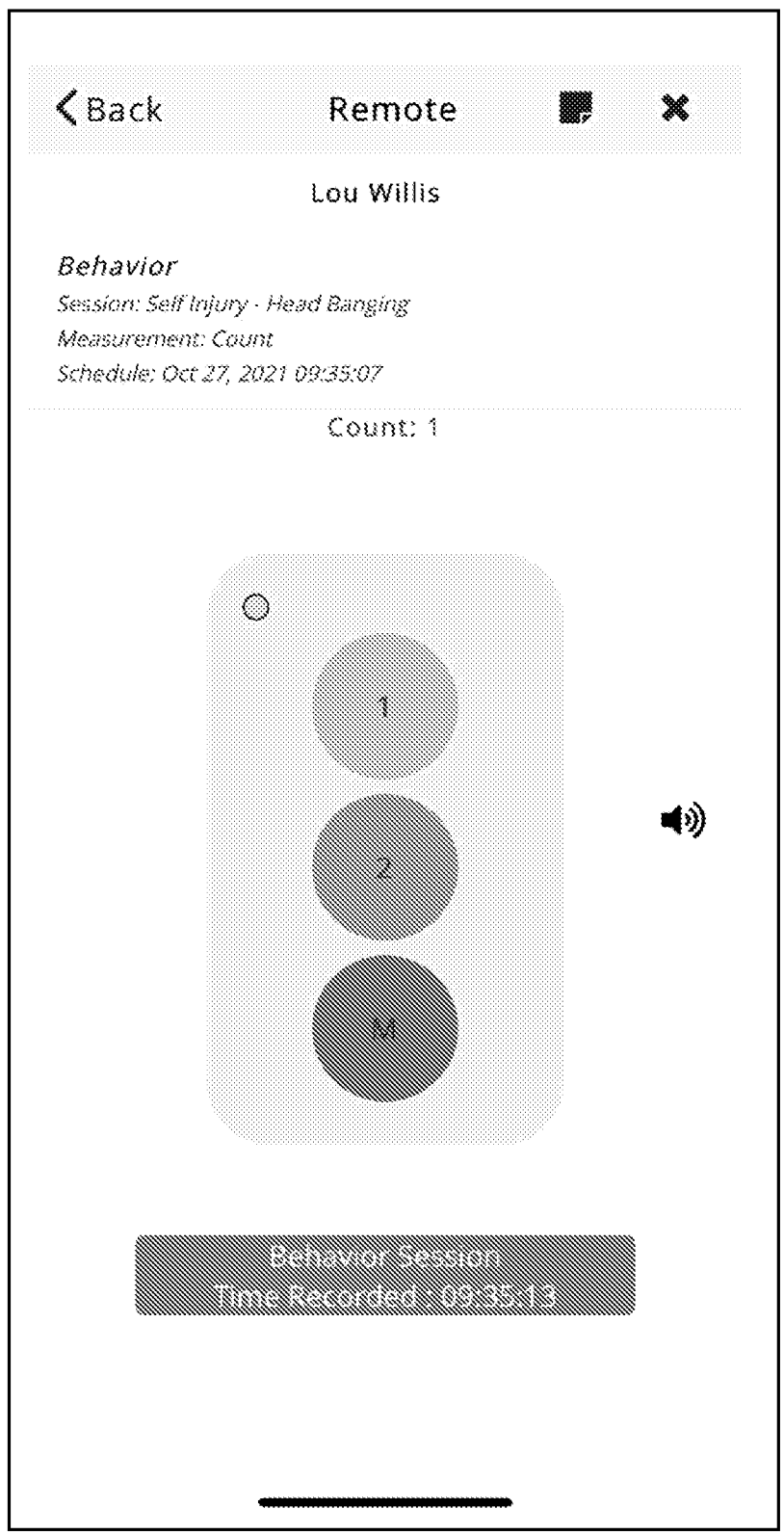
Figure 23:
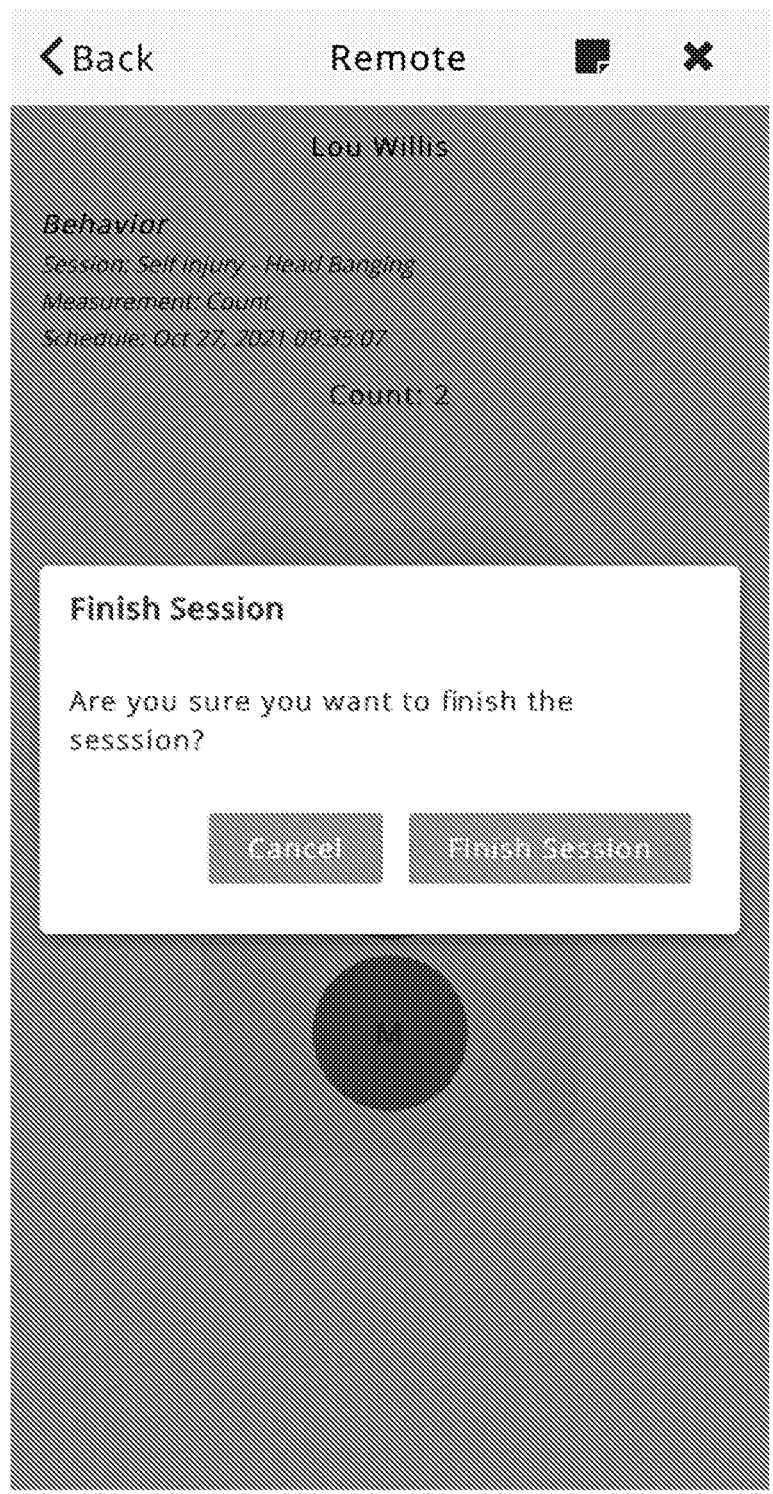
Figure 24:
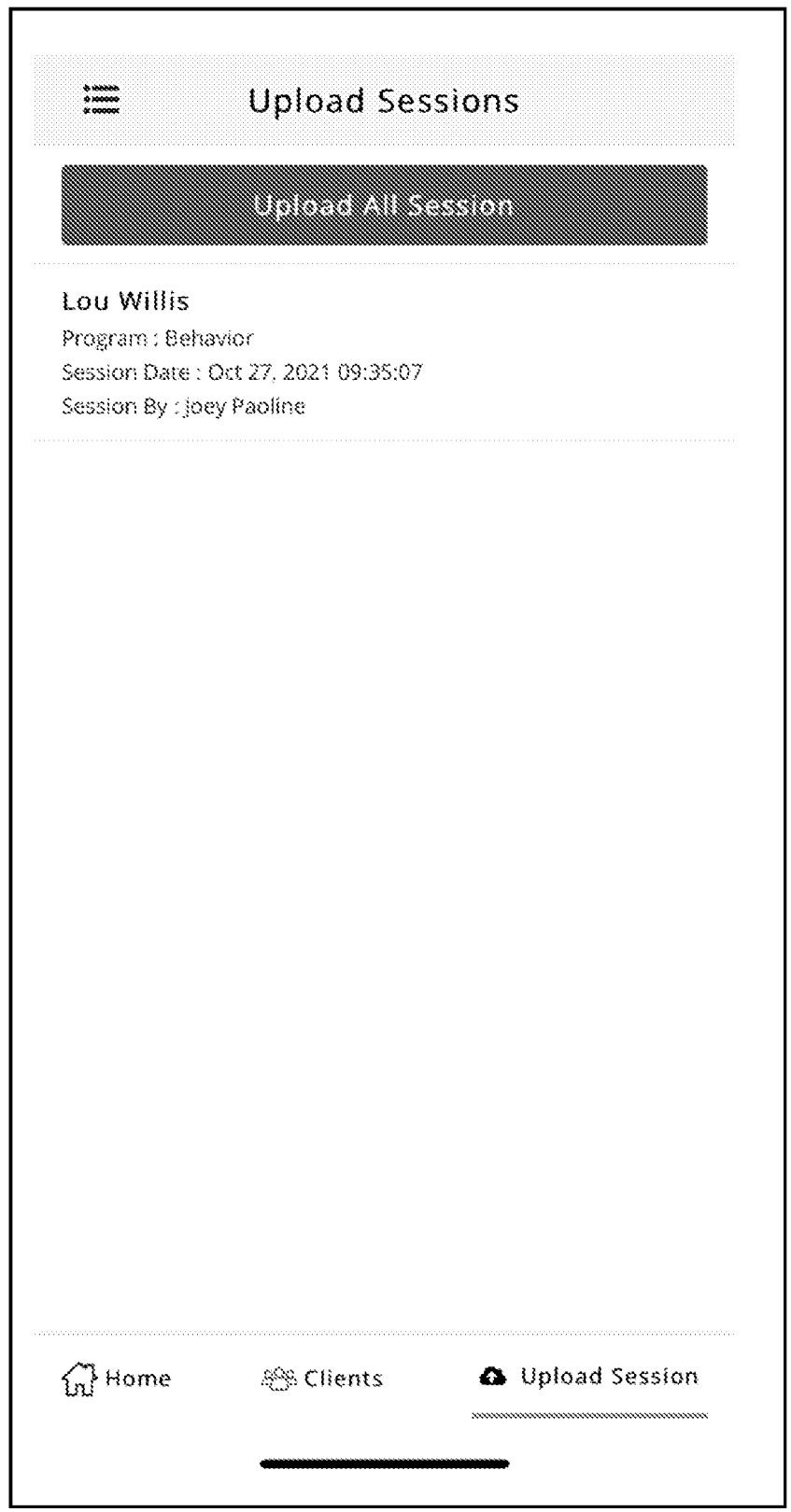
Figure 26:
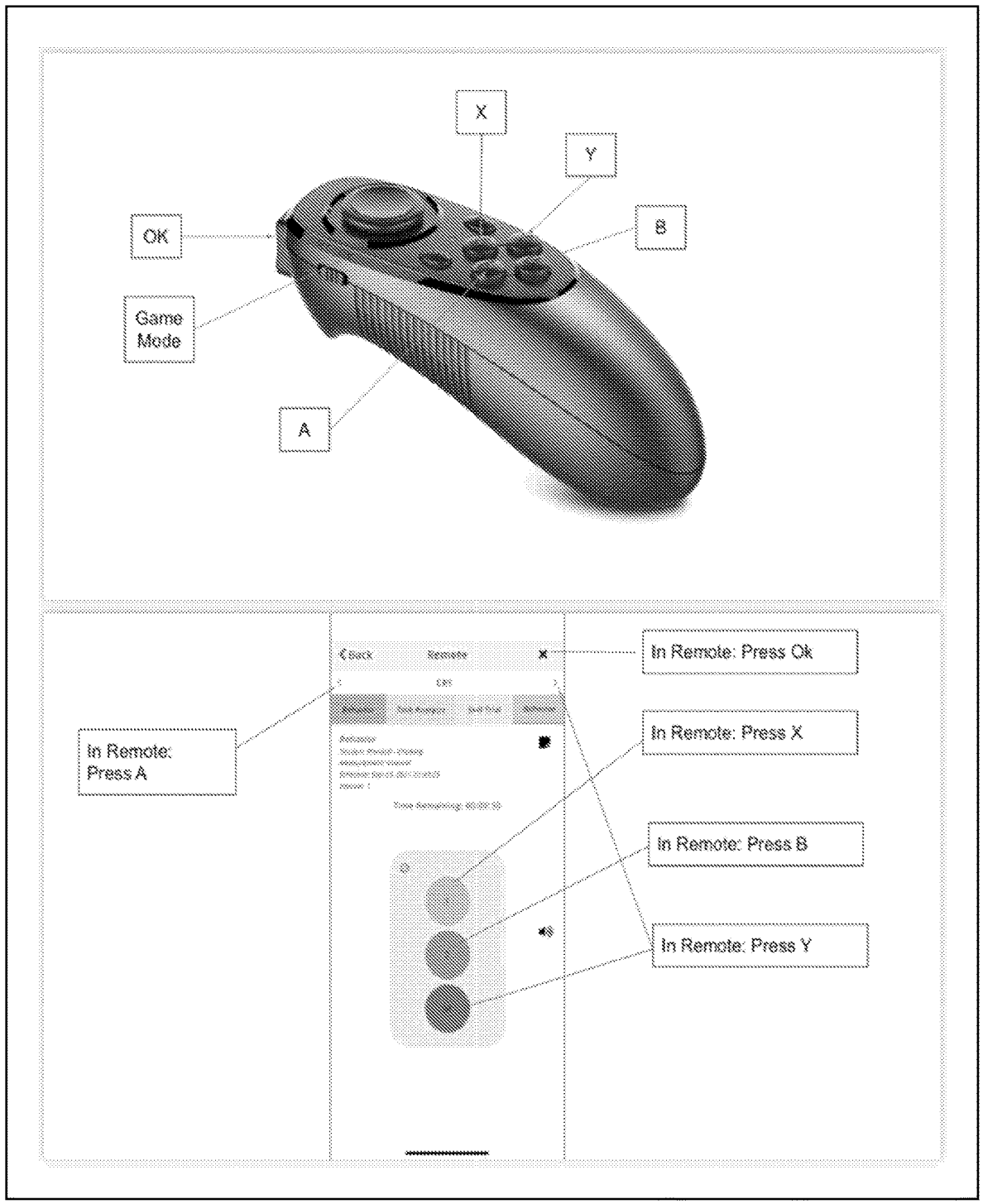
FIG. 26 is a schematic diagram of a remote and a virtual remote screen in accordance with preferred embodiments of the present invention.
Figure 27:
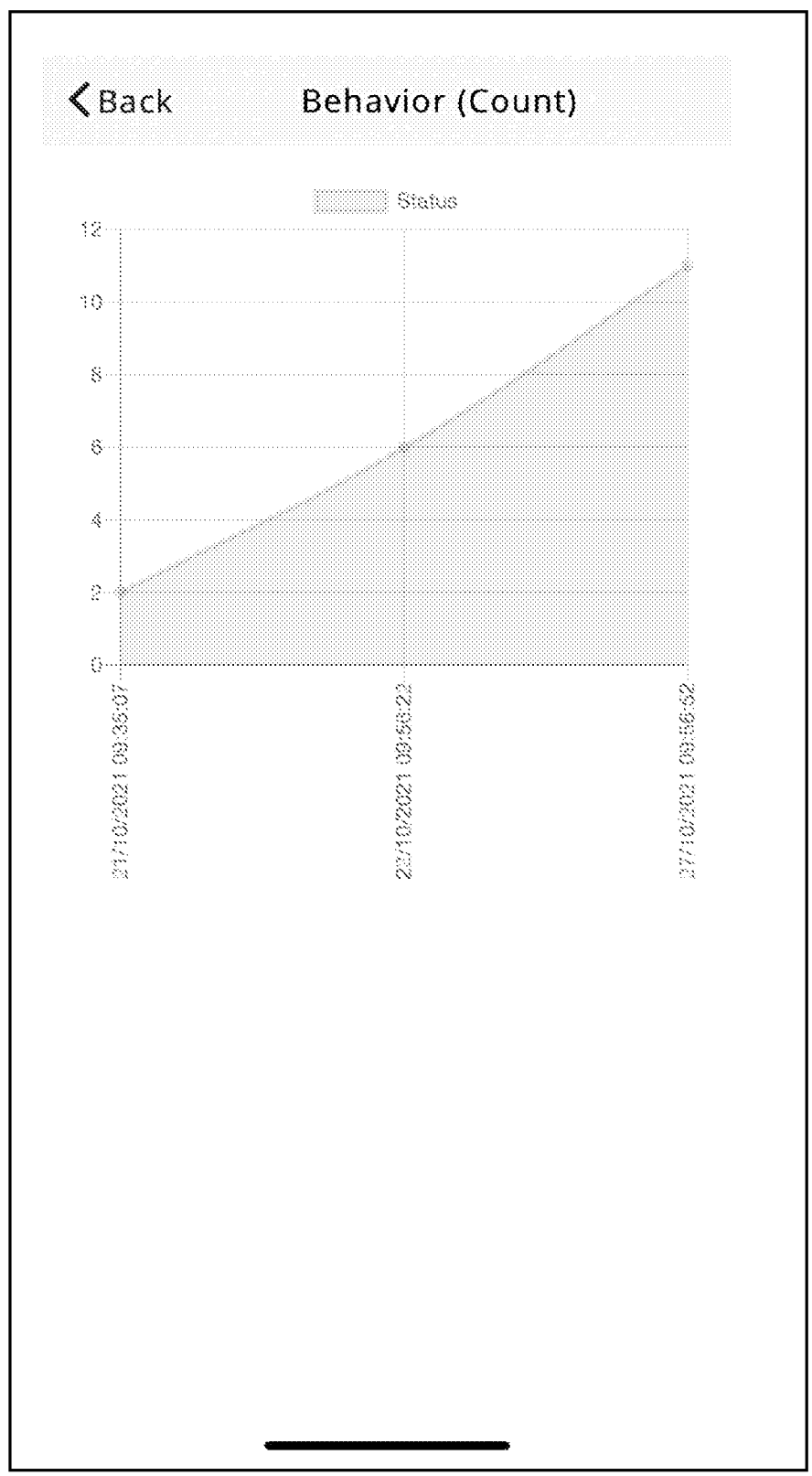
FIG. 27 is another user interface display screen in accordance with preferred embodiments of the present invention.
Figure 28:
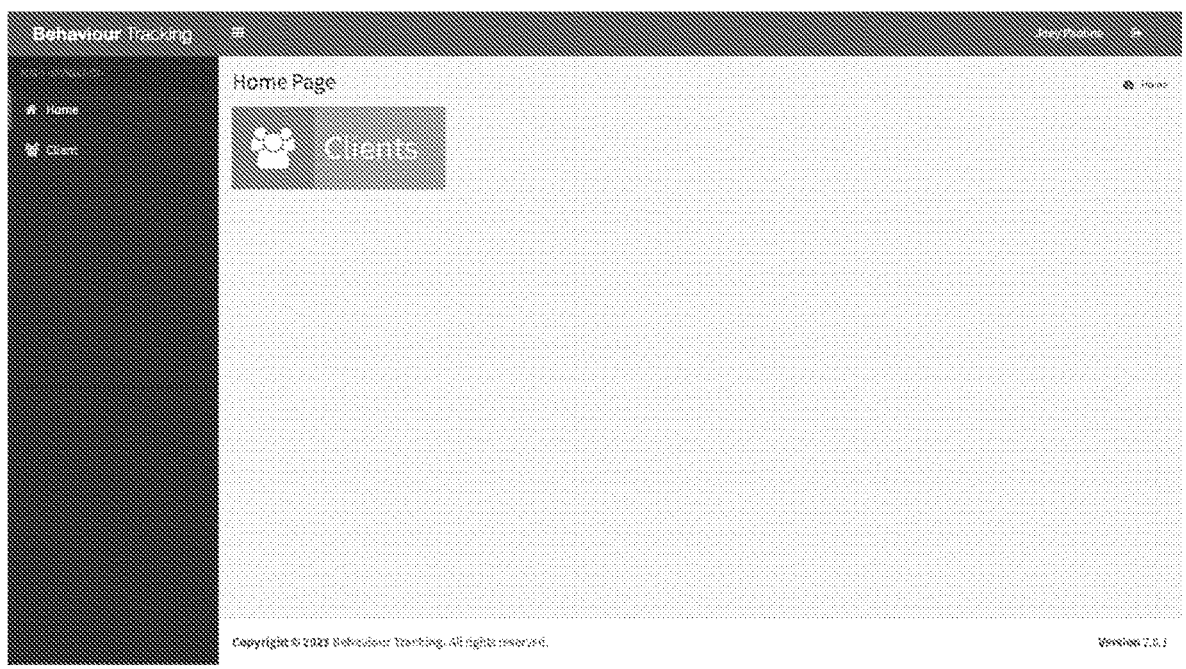
FIGS. 28-30 are display screens of a website component in accordance with preferred embodiments of the present invention.
Figure 29:
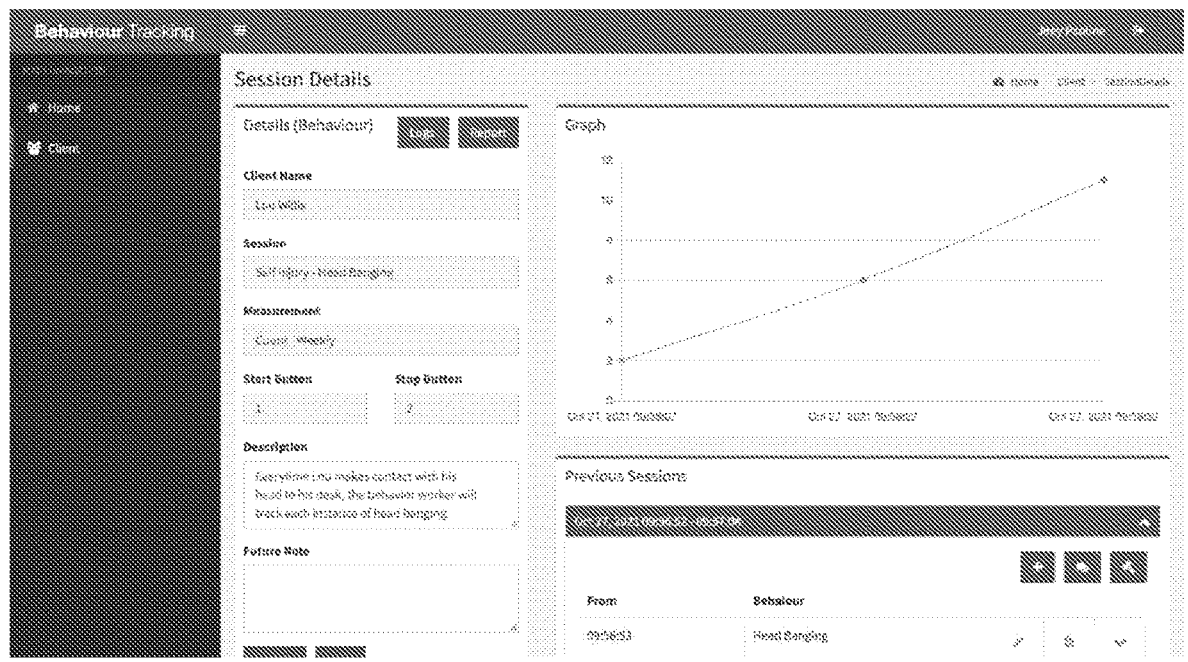
Figure 33:
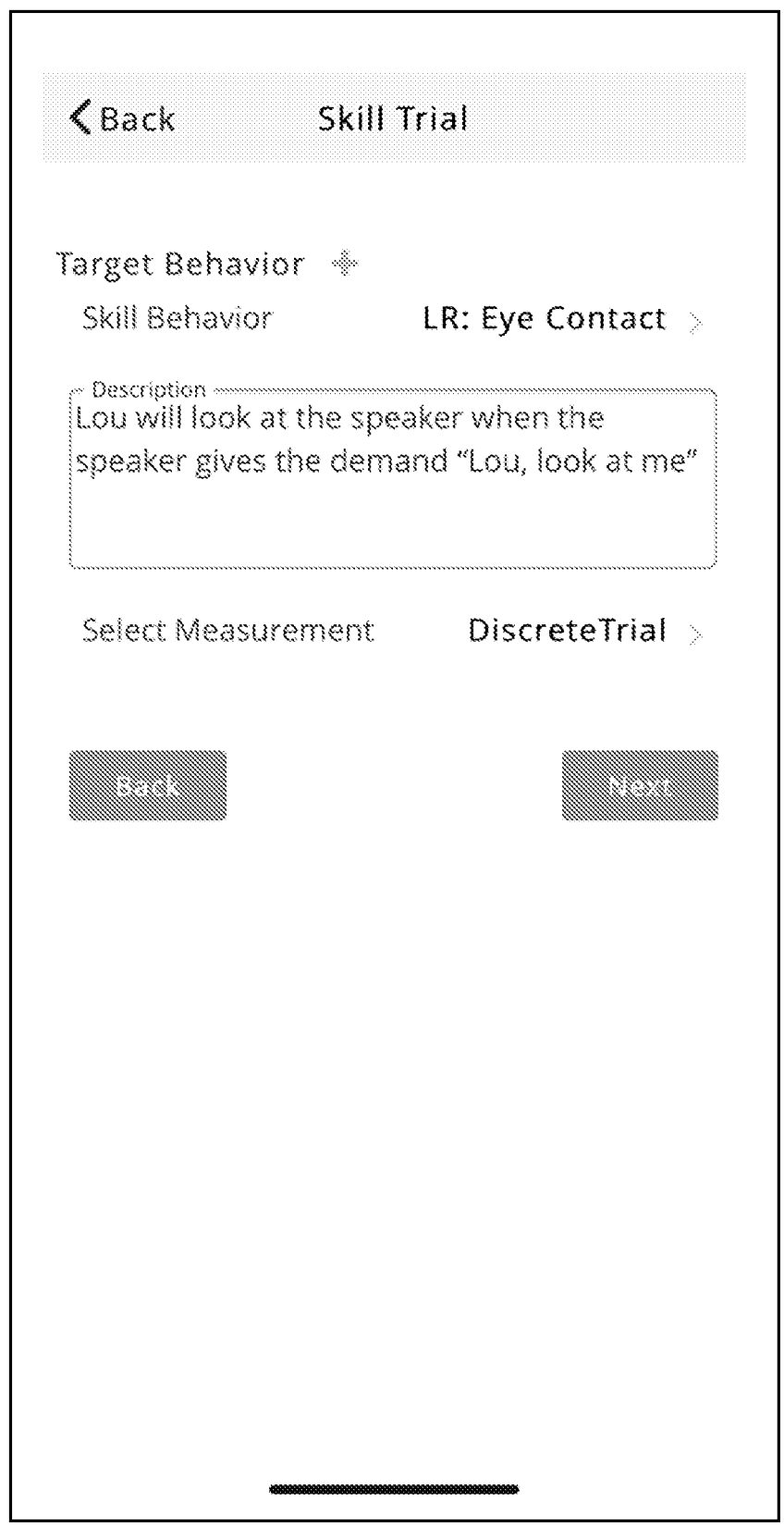
Figure 34:
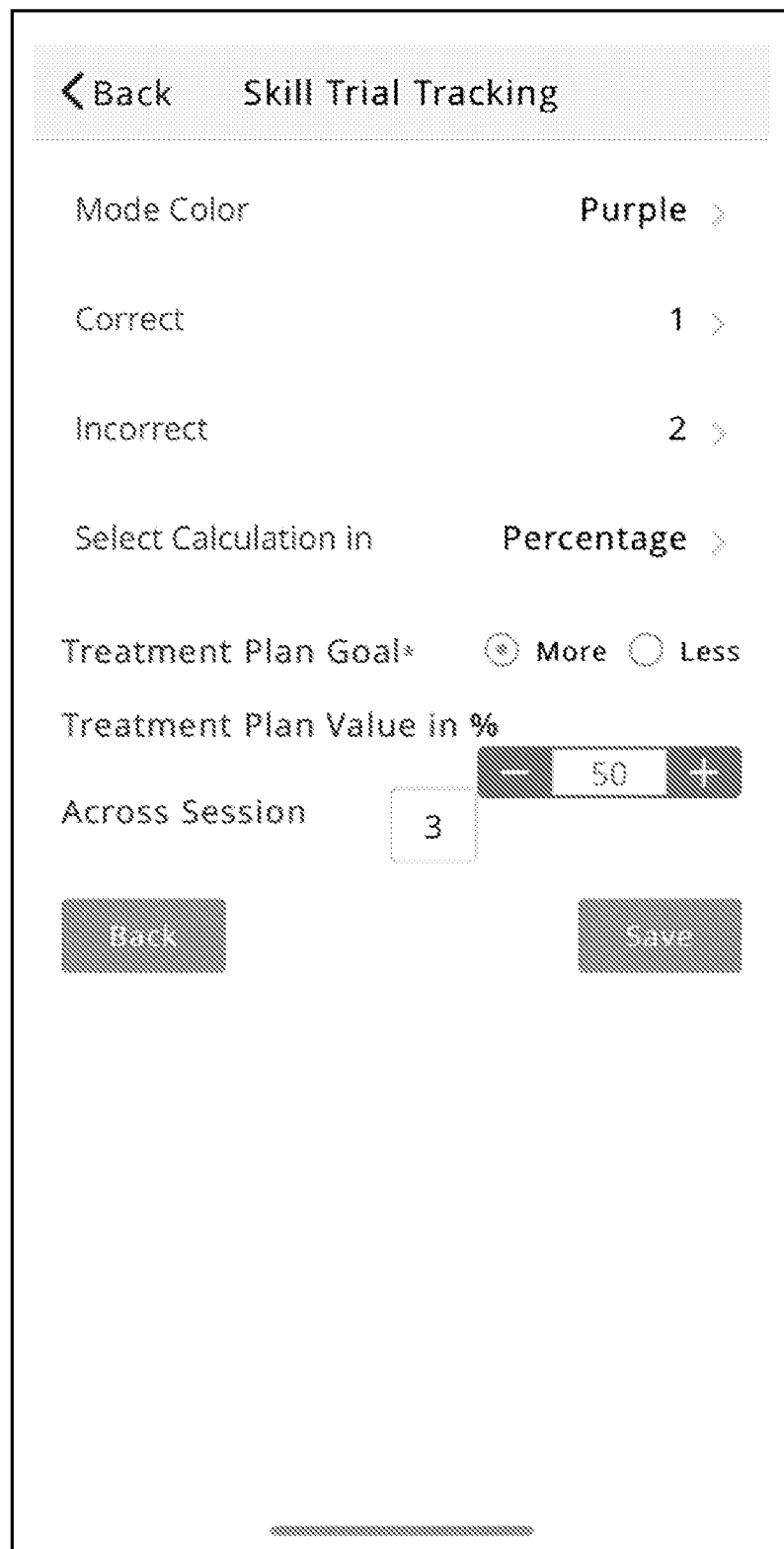
Figure 35:
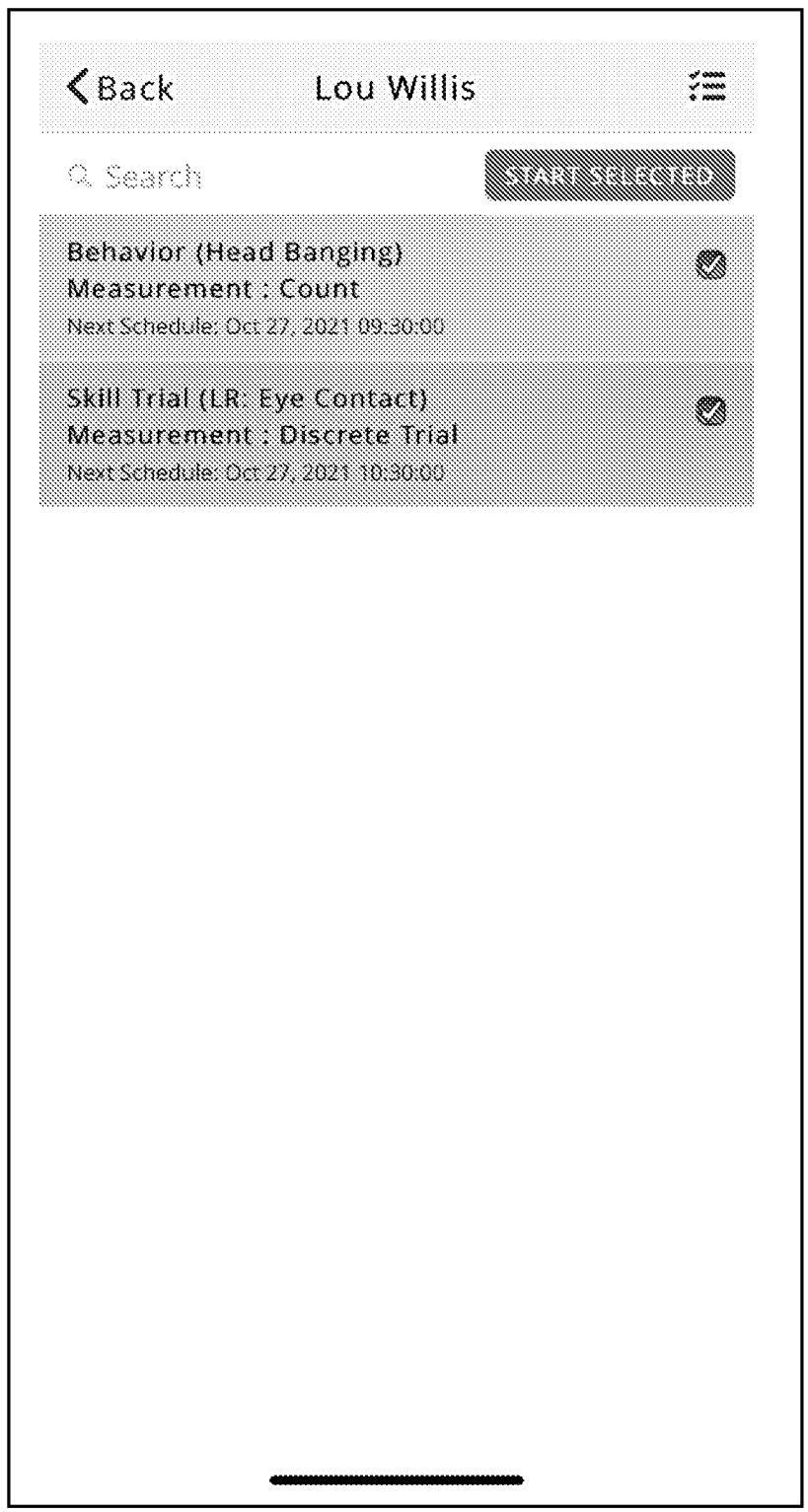
Figure 38:
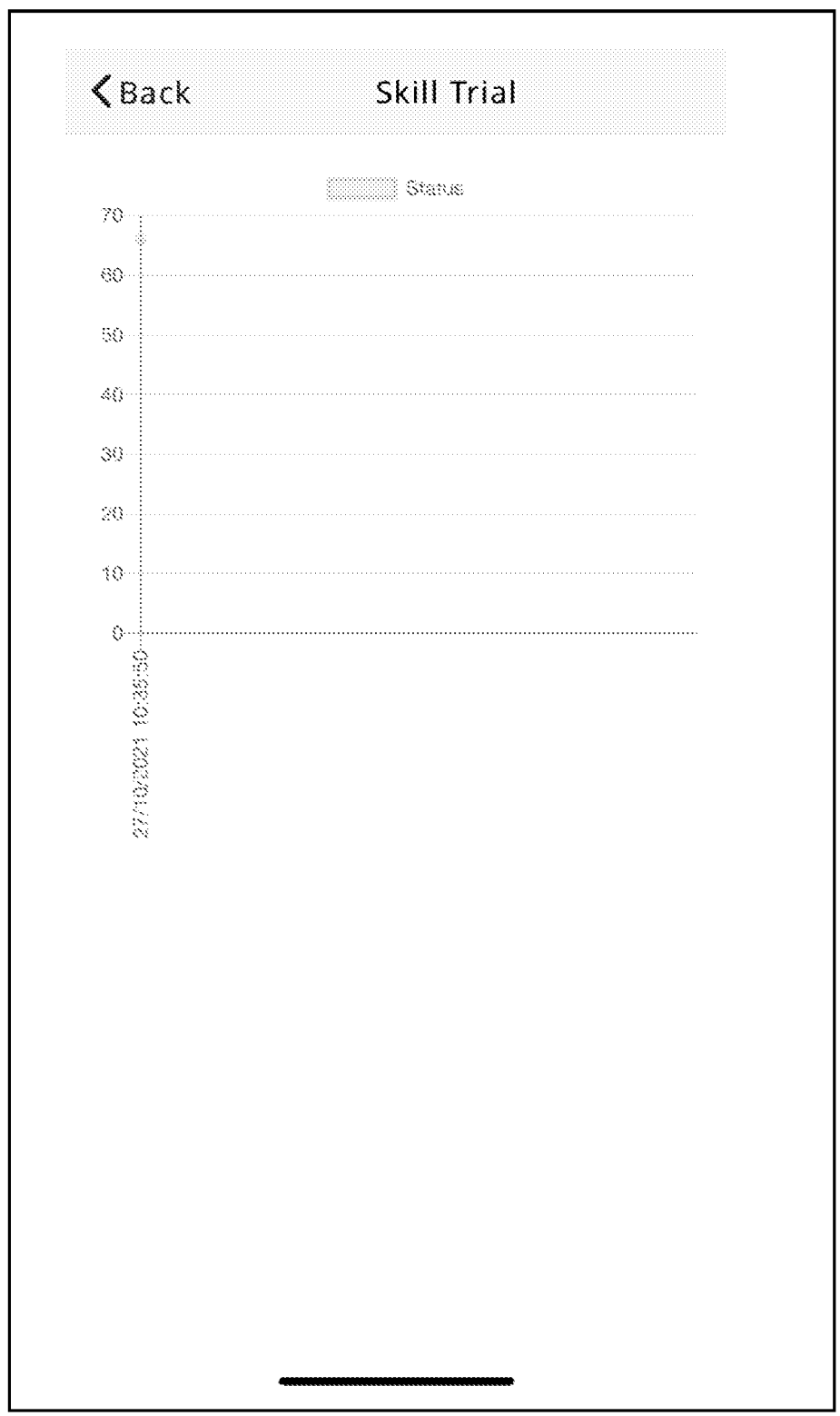
Figure 42:

The source code shown in the Appendix includes Parts 1-20, which correspond to the following figures:
 Part 1: FIGS. 5, 29
 Part 2: FIGS. 6, 22, 23
 Part 3: FIGS. 7, 21, 31, 35, 43
 Part 4: FIGS. 8, 26
 Part 5: FIGS. 9, 24, 36, 37, 44
 Part 6: FIGS. 10, 11, 25, 40, 45, 46
 Part 7: FIG. 12
 Part 8: FIG. 13
 Part 9: FIG. 14
 Part 10: FIGS. 15, 20
 Part 11: FIG. 16
 Part 12: FIG. 17, 32
 Part 13: FIGS. 18, 19
 Part 14: FIGS. 27, 38
 Part 15: FIG. 28
 Part 16: FIG. 29
 Part 17: FIG. 33
 Part 18: FIG. 34
 Part 19: FIG. 41
 Part 20: FIG. 42

Selected aspects of FIGS. 52-55 are also implemented using respective portions of the source code in these parts.

One non-ASCII character appears in the original source code, and was changed to an ASCII character to allow for electronic filing of the Appendix. Specifically, multiple lines of code that appears throughout the Appendix uses a multiplication sign "x" which was identified as being a non-ASCII character. Each instance of the multiplication sign "x" was replaced with the ASCII character of "x." The full line of code that includes the multiplication sign "x" is as follows: <a type="button" class="close" data-dismiss="modal">x</a>

SUMMARY

Figure 1:
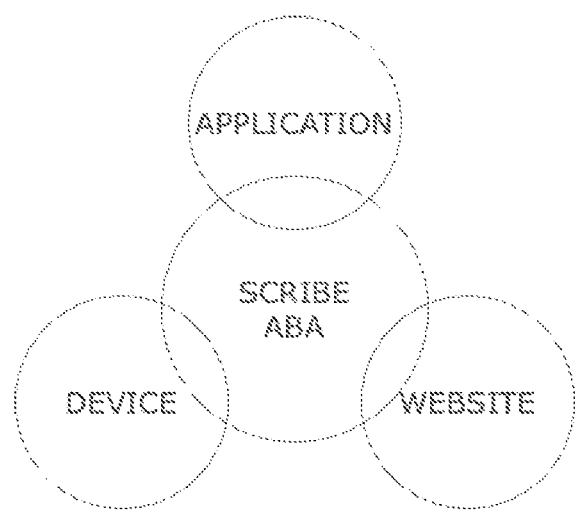
FIGS. 1-3 are project component views of preferred embodiments of the present invention.

Project ABA ("Project") is a behavioral tracking design that encapsulates three main components as depicted in FIG. 1. The first component is a mobile application (app) that functions within the iOS operating system. The application assists the users to have access to essential methods to track fundamental biometrics. Within the application, the user can manage clientele, customize behavior tracking programs, and have access to automated data entry and graph analysis. The second component is a web-based platform. This website allows its users to have access to HIPPA compliant online storage server that saves behavioral data and displays the data in an automated graph. These graphs and data inputs can then be exported as a spreadsheet for the users to download into popular spreadsheet application such as Microsoft Excel or Google Sheets to perform further analysis, if applicable. The final component is a remote-like physical device (remote) that is connected to the application via Bluetooth. The remote is customizable within the application, which allows the user to predetermine what the button inputs track.

The remote provides a novel approach for a user to track fundamental behavioral data in real time and have that data automatically analyzed, all from a simple button pressed via a physical device (the remote) paired by Bluetooth. This provides a nonconventional means of data collection which allows untrained people (non-specialists) to collect and graph complex data inputs easier than ever before. All the person needs to do is press a button on the specially programmed remote. Data associated with the pressed button is uploaded to the server and the software handles everything else.

Application

Clients

Figure 2:
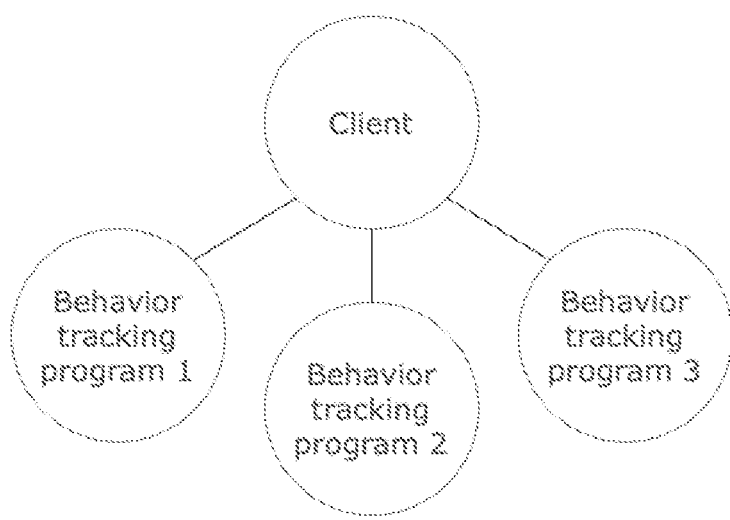

Creating, organizing, and managing clientele is the first experience a new user will have on the Project iOS application. When first creating a client, the user will need to indicate their client's schedule, along with the times and a start date. After establishing the schedule, the user will then need to indicate what type of behavior tracking program is being used. After determining the first behavioral tracking program, the client will then be added to the user's list of clienteles. Clicking on the newly created client will allow users to access the behavioral tracking programs that are associated with the regarded client. Within the client panel, the user can now add additional behavior tracking programs and pair them to the client. This is depicted visually in FIG. 2.

Programs

Figure 3:

Upon enrolling a new client, the user will then create a program to measure and collect behavioral data. These programs are customizable which allow the user to tailor the behavior tracking experience to best fit the client's needs. There are currently three programs: behavior, task analysis, and skill trial. This is depicted visually in FIG. 3.

Behavior will track when the client engages in a predefined behavior. This tracking can be broken down further into measurements, specifically to count the frequency or duration of the behavior.

Figure 4:
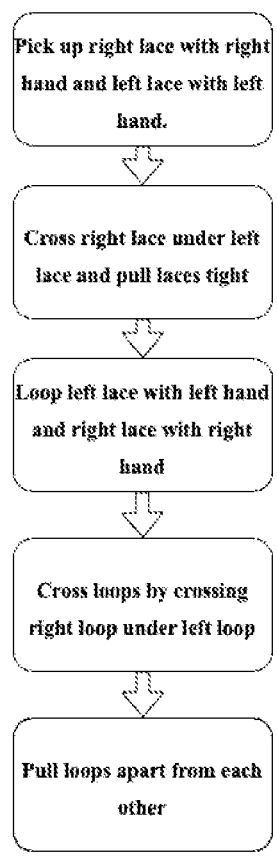
FIG. 4 is a flowchart of a task workflow in accordance with one preferred embodiment of the present invention.

Task analysis breaks a more complicated or lengthier behavior into multiple components. These smaller steps are measurable parts to achieve the overall goal, as seen in FIG. 4, which displays the steps of "shoe tying behavior."

Task analysis will then allow the user to record correct/incorrect responses for each individual step to indicate whether the step was completed accurately as defined. During task analysis, the user will record one correct/incorrect response per step. The program will then automatically go to the next step until the end of the task. At the end of the task analysis the "correct" responses are divided by the total number of steps to get a percentage of completed steps. For example, if a client was tying their shoes using the steps from FIG. 4, and they were able to complete every step besides the last one, they would have completed 4/5 or 80% for the shoe tying steps.

Figure 36:
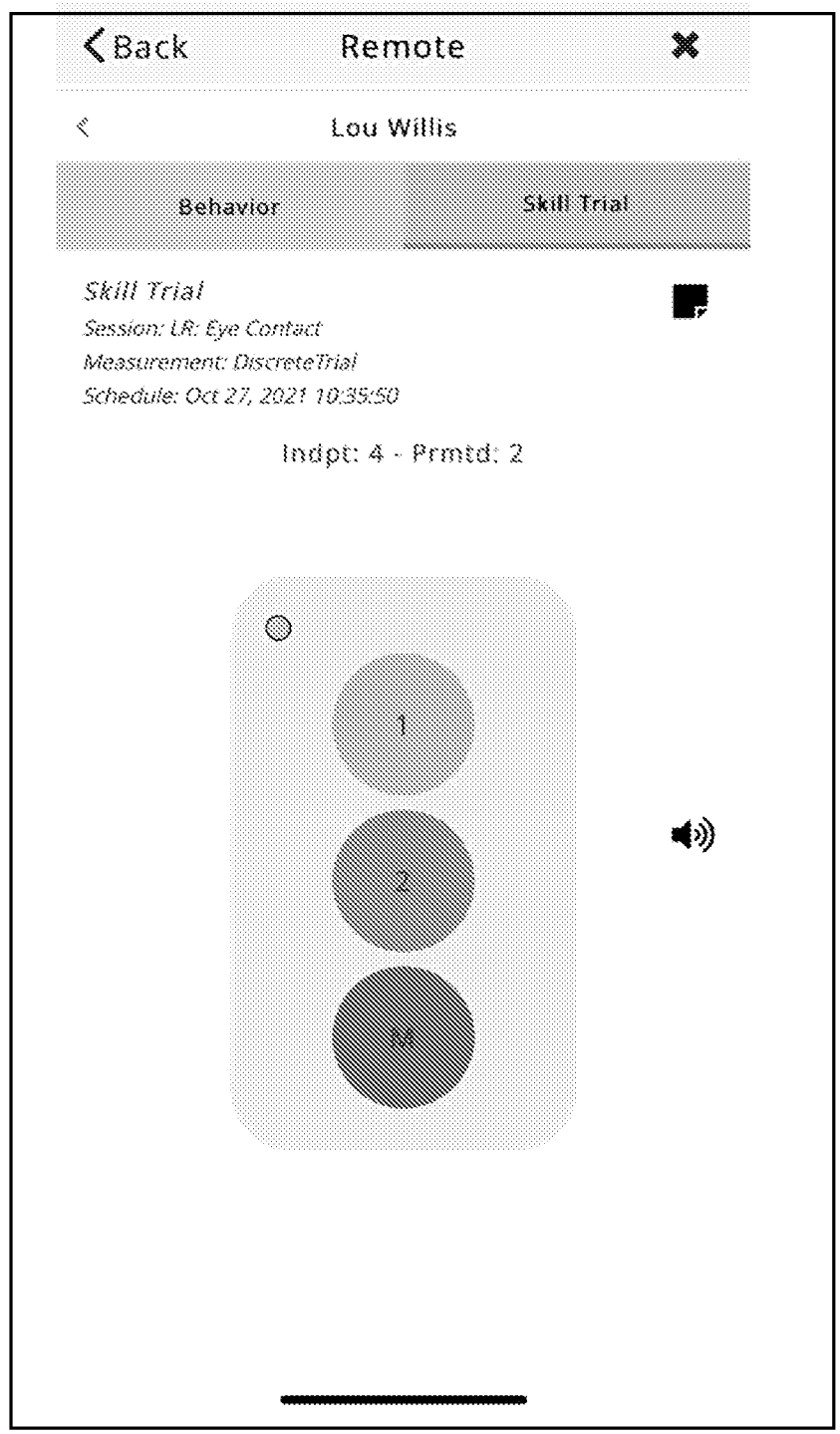
Figure 37:
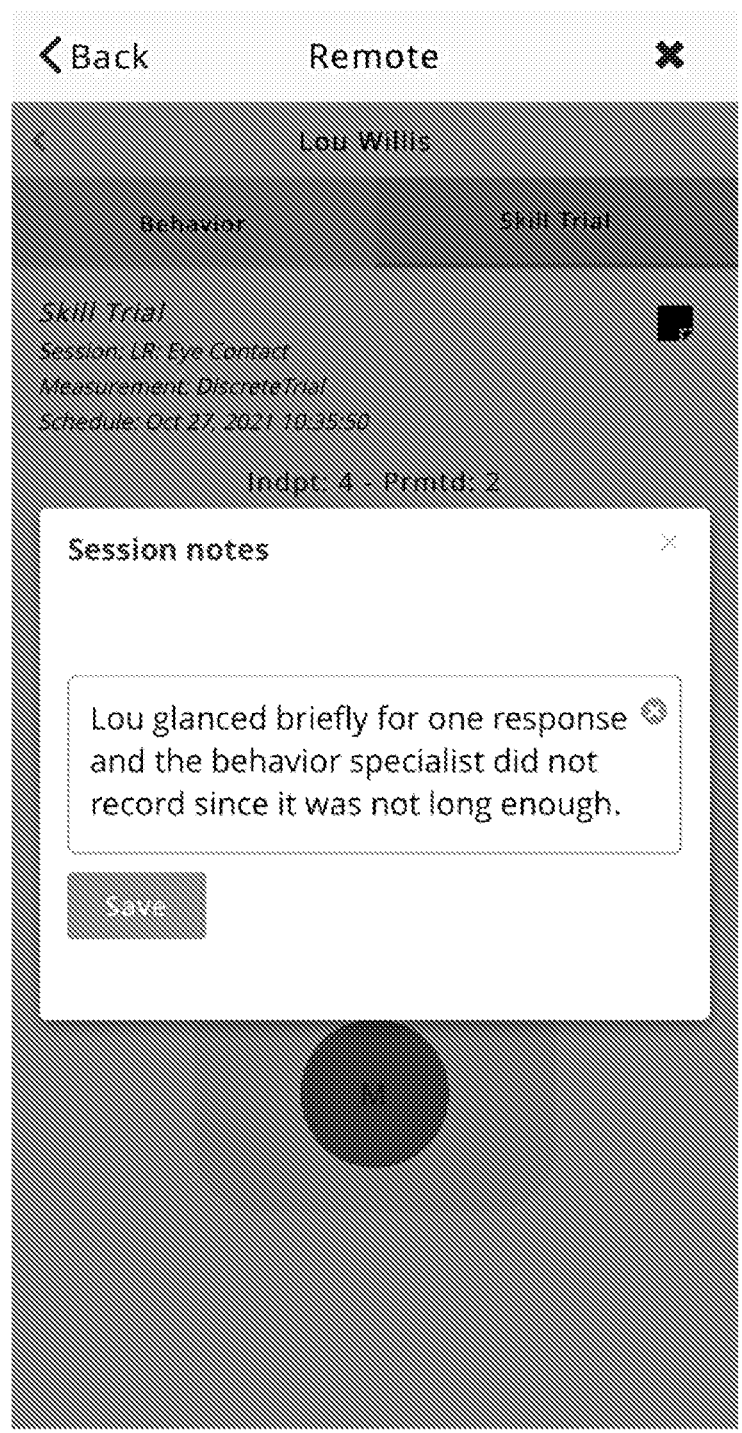

Skill trial is the last tracking program. During skill trial program, the user can record an unlimited amount of correct or incorrect responses about a single behavior. For example, if the client's behavior goal was independent eye contact, the user can indicate "correct" or "incorrect" for when the client looks or does not look, displayed in FIGS. 33, 34, and 36. FIG. 33 displays how to create the behavior goal. FIG. 34 shows how to customize the program settings. FIG. 36 shows the completed program actively recording eye contact responses: button 1 for correct response, button 2 for incorrect response. When the trial is deemed completed, the total is calculated by taking the "correct" responses and dividing them by the total responses to get a percentage of completion.

Measurements

Measurements are determined by the user after a program is selected, as seen in FIG. 19 and at the bottom of FIG. 33. There are currently five ways to measure behavior: count (frequency), duration, latency, interval, discrete trial. Count measurement, FIGS. 18, 21, and 22 allows the user to count/tally the frequency of the behavior observed. Duration measurement allows the user to record the time a behavior lasts for (FIG. 6). Latency measurement allows the user to record the time between the request/demand, and the given behavior occurring. Interval measurement divides the total session time into smaller increments, allowing the user to report if the behavior occurred within the smaller divided timeframes. For example, a one-hour session from 9:00 AM to 10:00 AM with 15-minute intervals would be four, 15-minute intervals: 9:00 AM-9:15 AM, 9:15 AM-9:30 AM, 9:30 AM-9:45 AM, 9:45 AM-10:00 AM. The last measurement is discrete trial, which is the only available measurement to be selected during the skill trial tracking program. FIGS. 33, 34, and 36 represents discrete trial measurement. In addition to discrete trial, discrete trial targets (FIG. 56) can be selected to collect cumulative record for multiple targets within the goal. Instead of creating five separate discrete trial goals to track the progress of five different matching pictures, the user can program all five pictures the child needs to learn to match under one discrete trial target goal (FIGS. 56-59).

Goals

Figure 39:
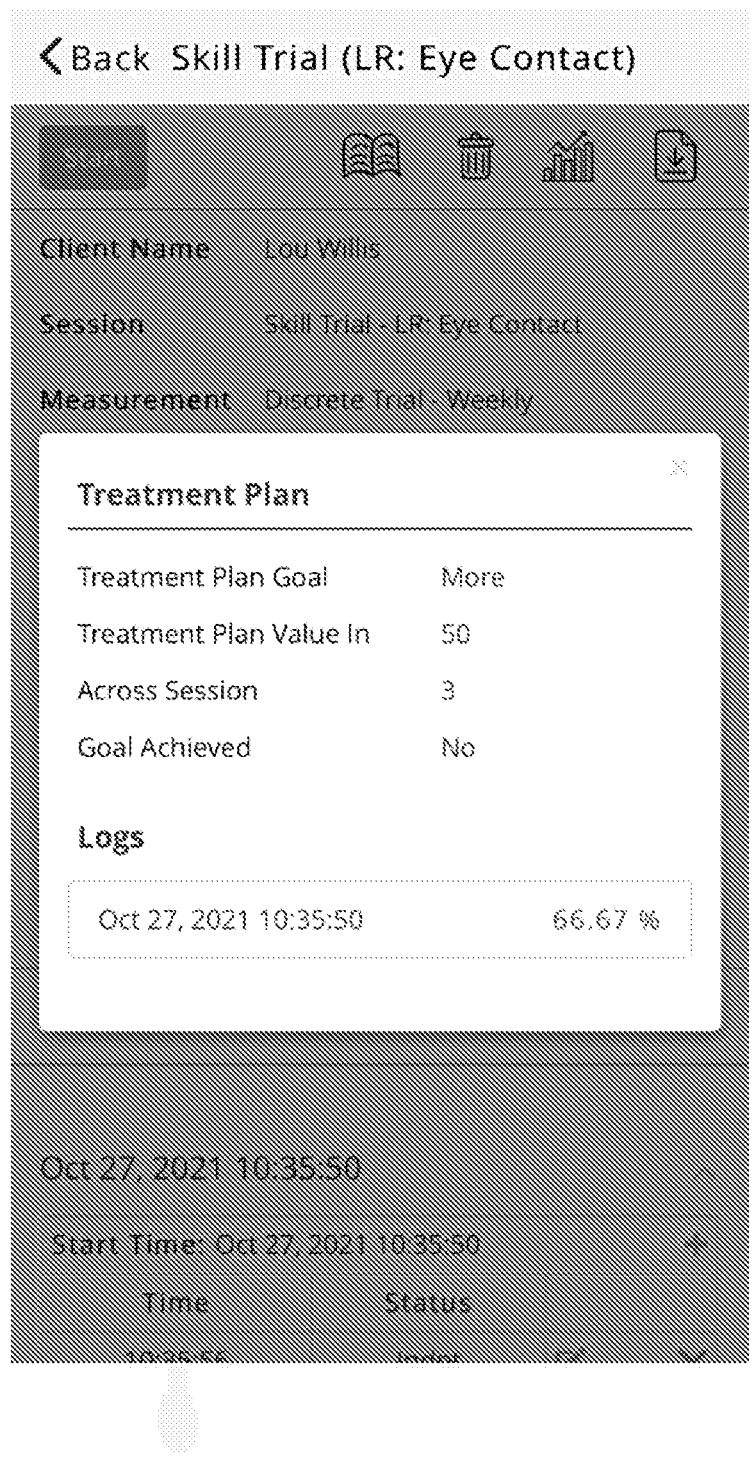

Goals allow the user to track the progress of their client's data to either discover trends or meet a criterion as shown as an example in FIG. 5. The user can input a custom value that the application will mark as "complete" once the reduction or increase in behavior is met. The user can make this goal contingent on the criteria occurring for multiple sessions. For example, the user could create a goal for eye contact, which is shown in FIGS. 33, 34 and 39. Dependent on the program created, goals can be written for percentages, frequency, or duration times.

Application Remote

After the user selects the program he or she wishes to use with the client, the application will open a virtual remote screen that is represented in FIGS. 8, 22, and 36, displaying various programs. Using the remote within the application, the user can begin to record behaviors with the programs that are already created. For example, with a behavior program tracking the duration of a client crying, the user can specify button 1 to start the timer, and button 2 to stop the timer. Here, the user will be able to record the data in real time with the simple press of a button. Once the user is finished with the session and recording the behavior, the user will simply exit out of the screen and click to finish the session, allowing it to be uploaded. The buttons 1 and 2 are also interchangeably referred to herein as "virtual buttons" which have unique "virtual labels."

Multiple Programs & Mode

Since there are many behaviors that can occur during a typical session, it is important to be able to collect data on multiple behaviors at once. The application will allow the user to select multiple programs to record data for all at once as seen in FIGS. 7 and 8. Pressing the "M" button or "mode," allows the user to shuffle through the multiple programs or targets on screen as an alternative to pressing behavior tabs above the onscreen remote in FIG. 8. The user can program a color coordinated "mode" for additional discrimination when next to other programs.

Uploading Sessions & Offline Mode

Once the user is finished tracking the data for the given session with a client, the user will then be able to upload that information to the server for further graphing and analysis. To be able to upload the information, the user must be connected to the internet. It is important to note that the application will still function in an offline mode without internet connection. While in offline mode, the user is still able to access clients, their programs, and even track data. Once the data is finished being recorded, the user's data will store offline until the application has established internet connection. Once internet connection is re-established, the user can upload the client's session to the server for further graphing and analysis, represented in FIGS. 9 and 24.

Session Documentation

Figure 64:
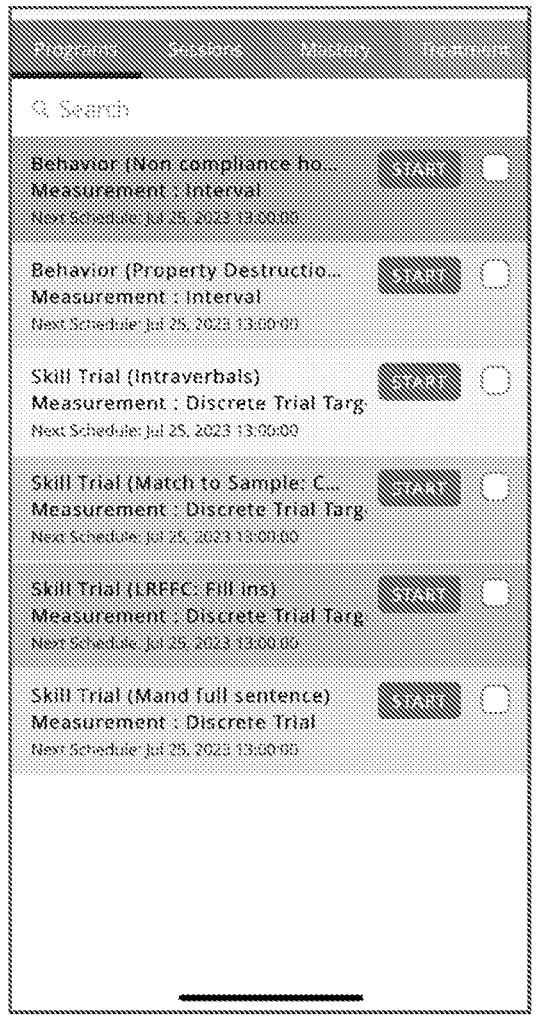

By clicking on the client, the user will be brought to the client's home page (FIGS. 60-64). The client's home page is their hub for information. Inside the home page, the user can access treatment demographics and plan information (FIG. 60), view their mastery tab for overall goal progression (FIG. 61), look at session dates with all behavior goals that were tracked (FIGS. 62 and 63), and finally view individual program's progress (FIG. 64). After a session is completed and uploaded, the user can view and edit the raw data that occurred by going to programs tab and selecting a program. Doing this will display the description and specifications of that program along with the user's history of data collection sessions. This is demonstrated in FIGS. 10, 25, and 45. The user can go back to the data and make edits to the session history in case an error was involved in data collection. However, when the user makes an edit to the collected data, this will provide a time stamp for when the edit occurred. The user is allowed to delete data points, edit the times of the data points, or even add additional data points. This allows supervisors or providers to be able to locate when and where changes were made to already collected data for potential auditing purposes. The supervisor or provider can locate these changes within the application's logs as seen in FIG. 13.

The user is also able to add notes to the specific session. These notes can further describe the behavior, what occurred before or after the behavior, or serve as reminders for the data collector to make changes after the session. These notes can be completed during the session or after the session for better documentation or explanation of what occurred during the session time. A practical example of this would be if the user made an error in documentation while recording the data, the user could leave a note, then change it after session is uploaded.

Figure 11:
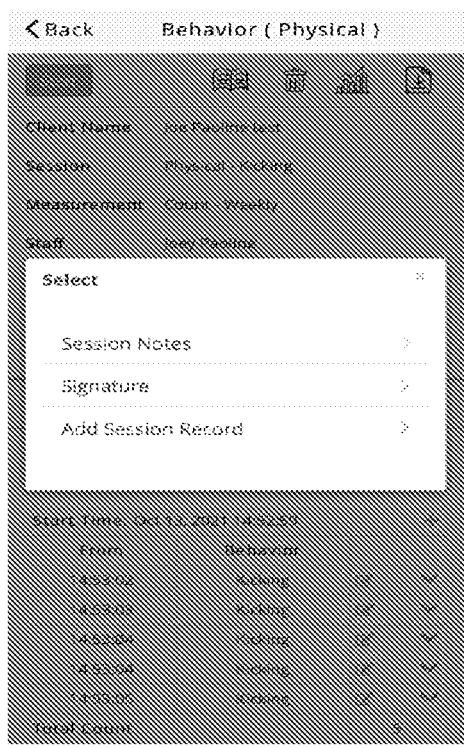
Figure 46:

Inside session documentation, the user is also able to record a signature (FIG. 46). Using this signature feature, users can authenticate the data is accurately representing the behaviors that occurred. This allows supervisors the ability to know the data was checked over for potential errors and that the user is signing their name as proof of their analyzation. FIG. 11 displays the edit screen for session history.

Data & Graphing

Every program has their own individual graph that displays the progression of data for each time the user records and uploads a session, seen in FIG. 27. For the graph to update, the session must be uploaded with internet connection. The data and the graph are stored on a HIPPA compliant server that allows the user to access it whenever they log into the application.

The data for the sessions can then be exported into spreadsheet file format to be further edited within applications such as Microsoft Excel or Google Sheets. This information is also accessible by accessing the server from the web-based platform as well.

Web-Based Platform

Figure 30:
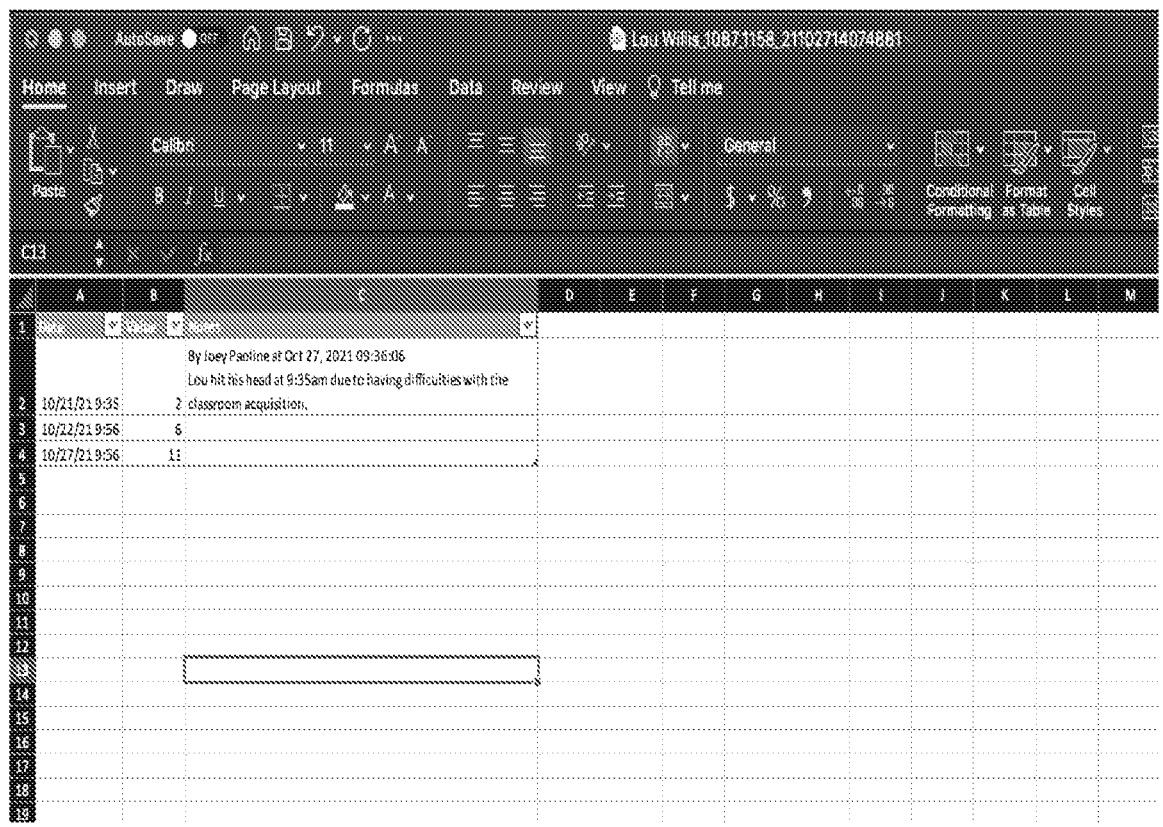
Figure 31:

In addition to Project being an application-based product, Project also has a website component, FIG. 28, which shows the website after user login. The website allows users to access data from their clients as well as allowing the supervisors to access data from all the clients depicted in FIG. 12. When accessing this data, the users or supervisors can make edits to the data just as if they were editing it within the application, as seen in FIG. 29. Whether the user edits the information on the website or the application, these edits will sync and update the graph, data, session notes, signatures, and the like. Just like the application, users can access reports from this webpage to open directly into spreadsheet applications such as Microsoft Excel or Google Sheets (FIG. 30). Session notes can also be imported into spreadsheet applications, which allows the user to have additional information as to why a datapoint may be different than the client's specific data average. The web-based platform allows ease of access for supervisors to observe and supervise multiple data collectors at once.

Physical Device

Figure 52:
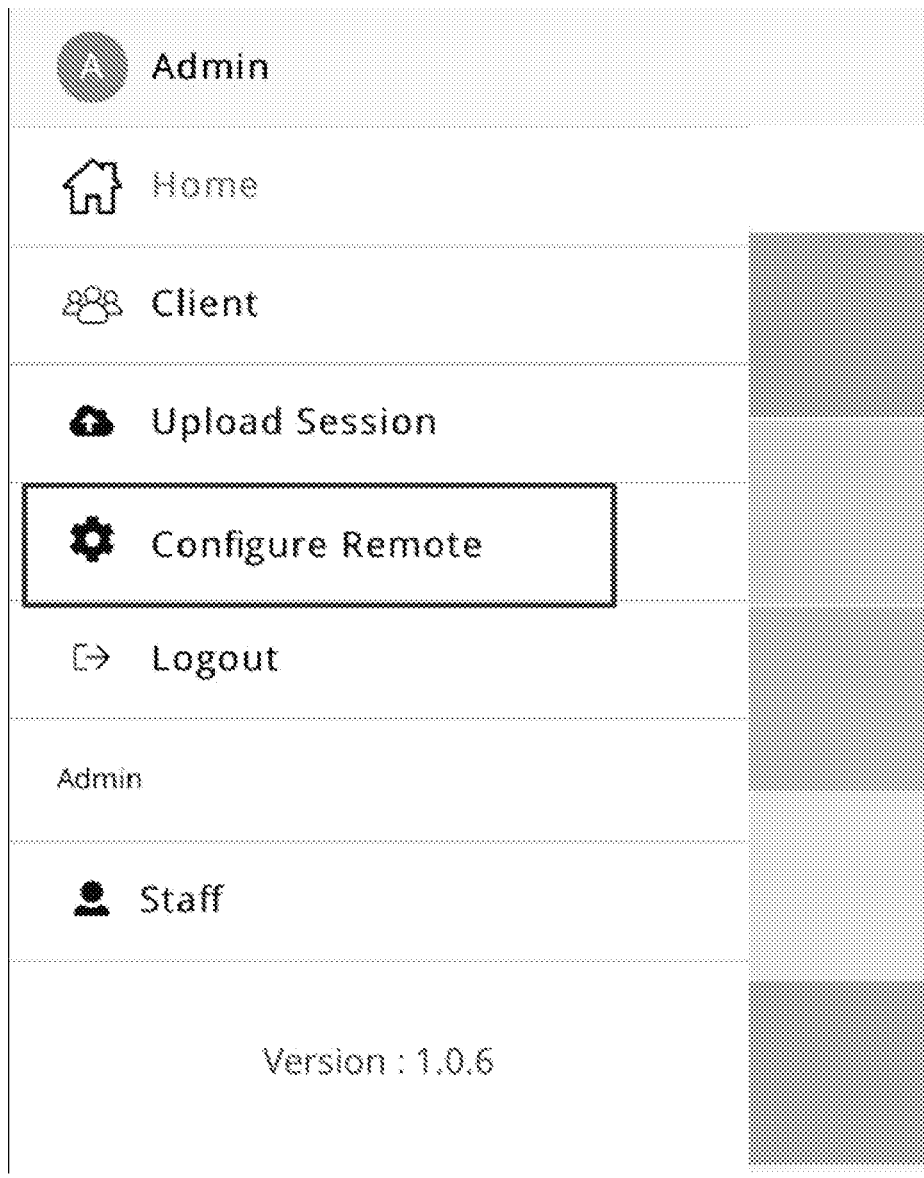
Figure 53:
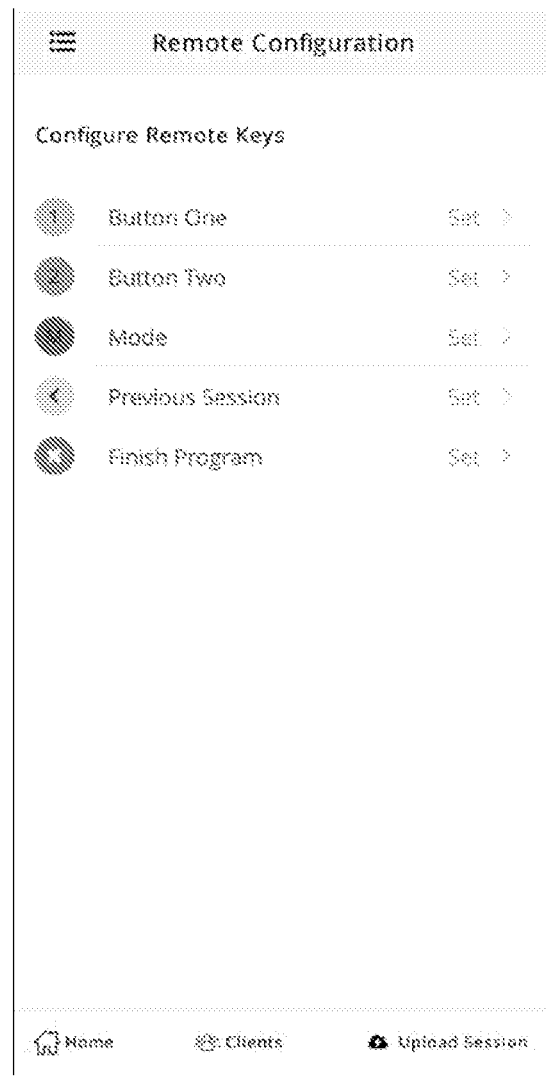
Figure 54:
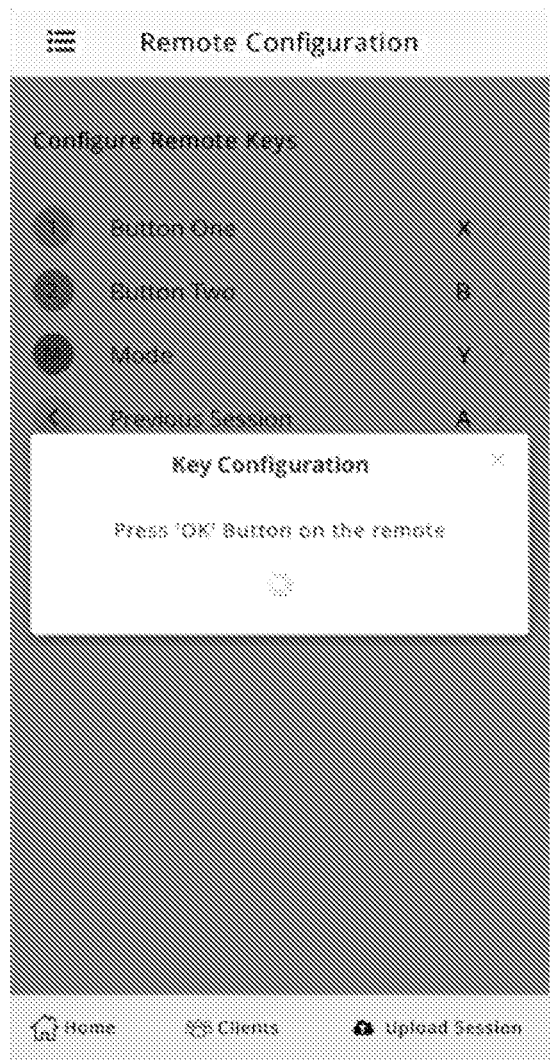
Figure 55:
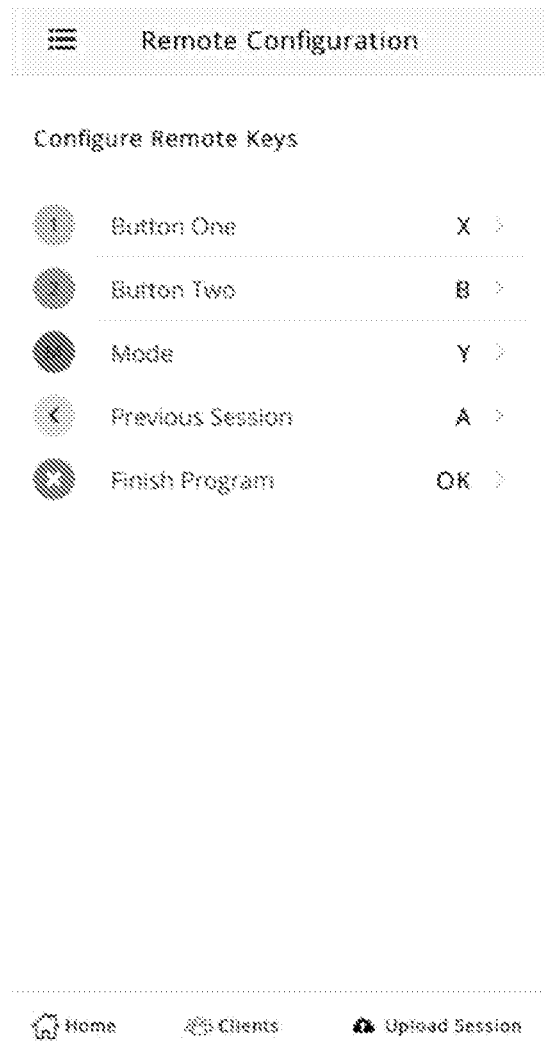
Figure 56:
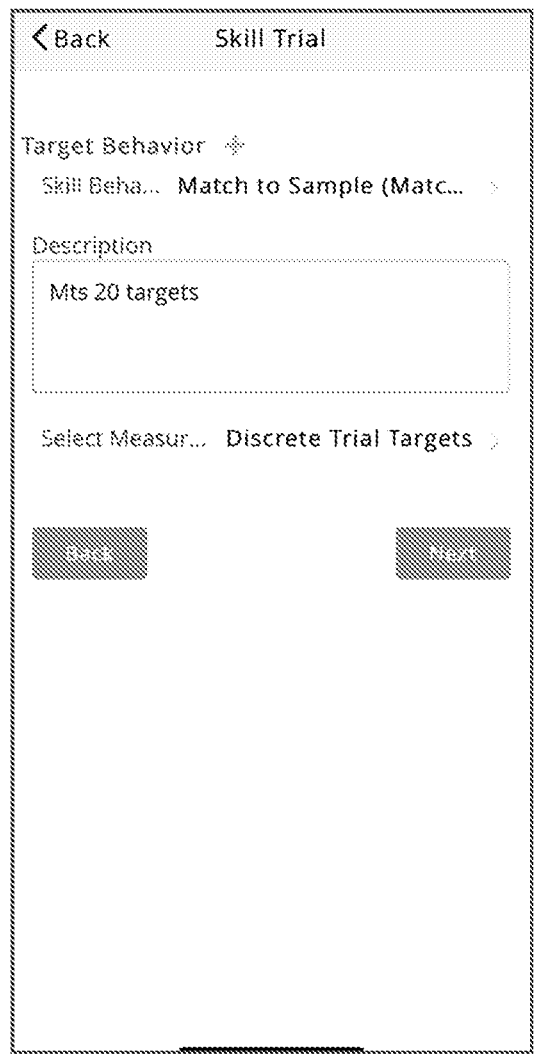
Figure 57:
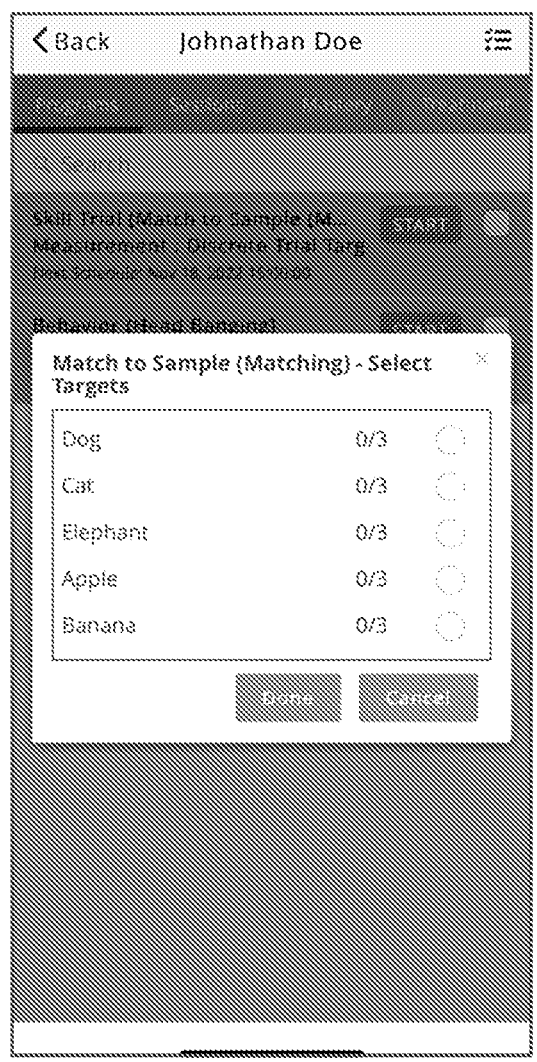
Figure 59:
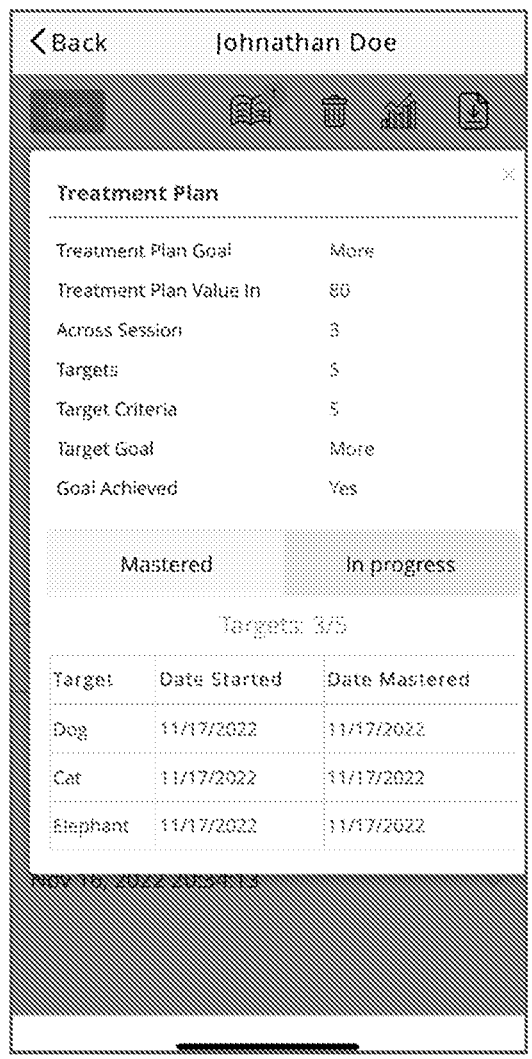
Figure 62:
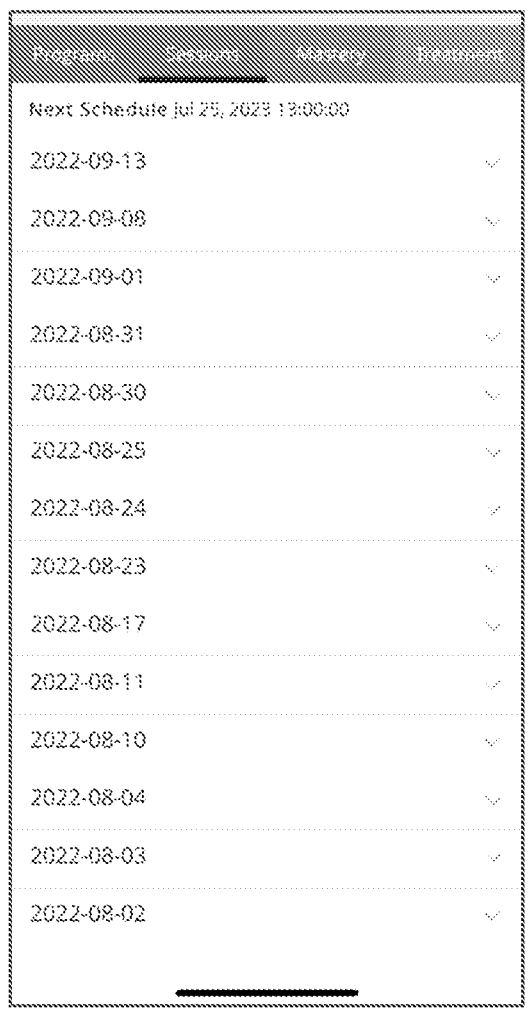

The user will have the option to collect data utilizing the on-screen remote or a physical remote that can be paired to the iOS application via Bluetooth. As well-understood in the art, the iOS application executes on a hardware device, such as a smartphone (e.g., Apple® iPhone). Once paired, the remote's buttons (also interchangeably referred to herein as "physical buttons" having unique "physical labels") will operate the application's remote screen to assist with data collection as seen in FIG. 26. The user will open the side panel to access "configure remote" once Bluetooth paired, as seen in FIG. 52. Once selected, the user will be able to set the remote's buttons to correspond to the application as seen in FIG. 53. The user will click "set" followed by pressing the physical remote button to pair it to the onscreen application remote button, as seen in FIG. 54. FIG. 55 demonstrates that all buttons have been programmed and the physical remote is ready to be used. (The user interface display screens for configuring the remote are also interchangeably referred to herein as "configuration display screens.") The user can now use the physical device just as if the user was using the onscreen remote for data collection as seen in FIG. 26. Once fully paired and set up, the user can now choose to either utilize the physical remote or utilize the onscreen remote to collect data. Utilizing the physical remote will allow the user more mobility when dealing with severe behaviors, and accuracy when recording higher frequency behaviors. It can also be utilized in cases where the clients are destructive to property, or data collection must be concealed more appropriately. Since the application's programs allow the user to predetermine what data these buttons track, the remote is also fully customizable to handle a vast array of behavior data tracking-based scenarios.

One suitable physical device is the portable wireless controller shown in FIG. 26 which is a FORTUNE TECH universal wireless VR remote and gamepad, also interchangeably referred to herein as a "universal clicker," a "programmable clicker," or "a physical remote input device." This wireless controller has the following product specifications:

1. Size: 116 mm×45 mm×13.5 mm; 0.4 ounces
2. Wireless Protocol: Bluetooth 3.0 compliant;
3. Wireless Distance: 2-10 Meters;
4. OS: Android/iOS/PC;
5. CPU: ARM968E-S Core;
6. Battery: Type size alkaline AAA 1.5V×2, Working time (Continuous game): About 40 hours, when power is low, LED will flash, please change the batteries.;
7. Work current: 0.5-8 mA; Standby current: 0.5-1 mA;
8. Shutdown current less 20 uA.
9. Brand: VR Empire Other brands or types of wireless controllers may be used, and the present invention is not limited to any particular brand or type of wireless controller.

Flow Charts

Figure 47:
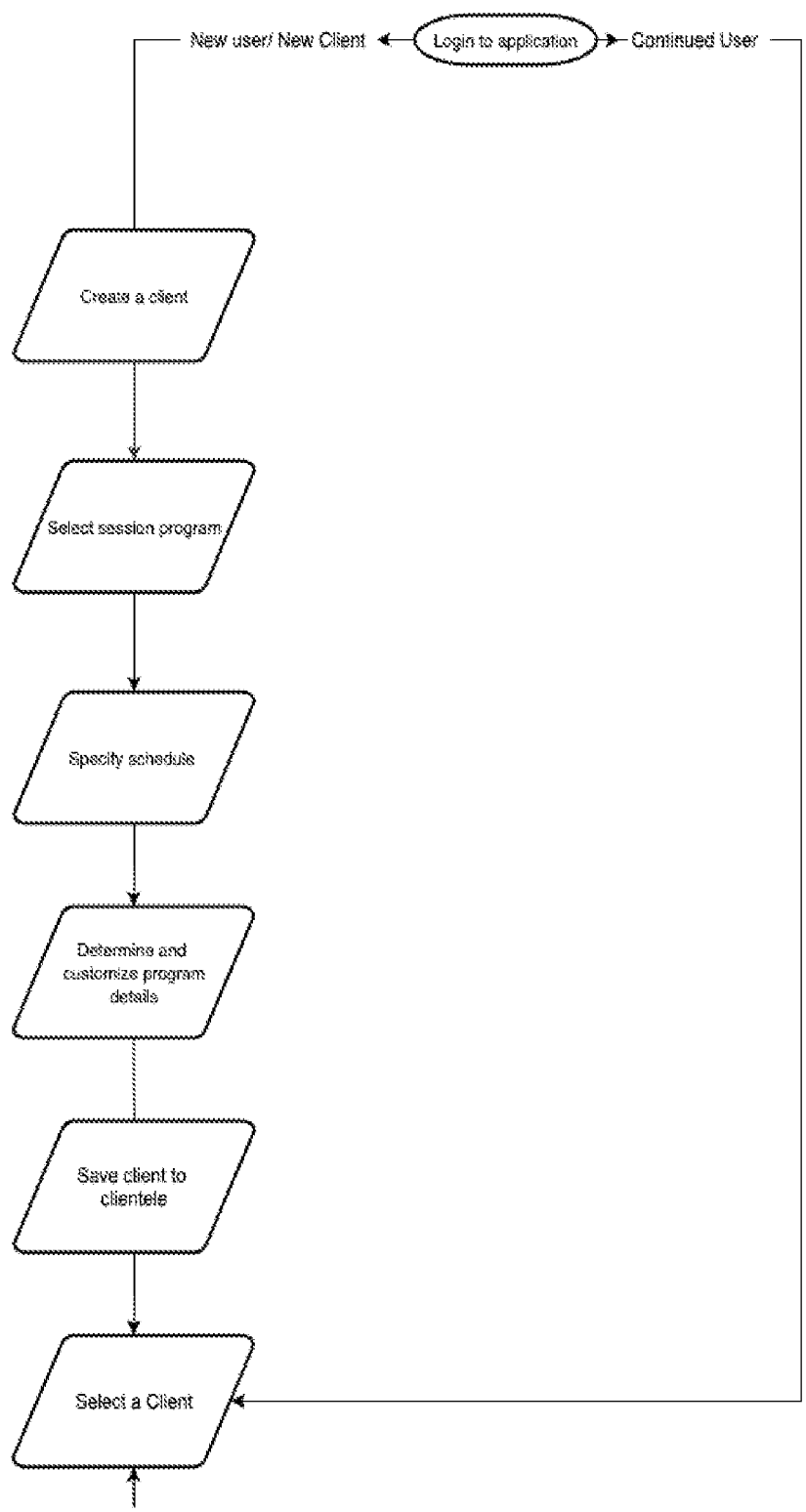
FIGS. 47-51 are flowcharts in accordance with preferred embodiments of the present invention.
Figure 48:
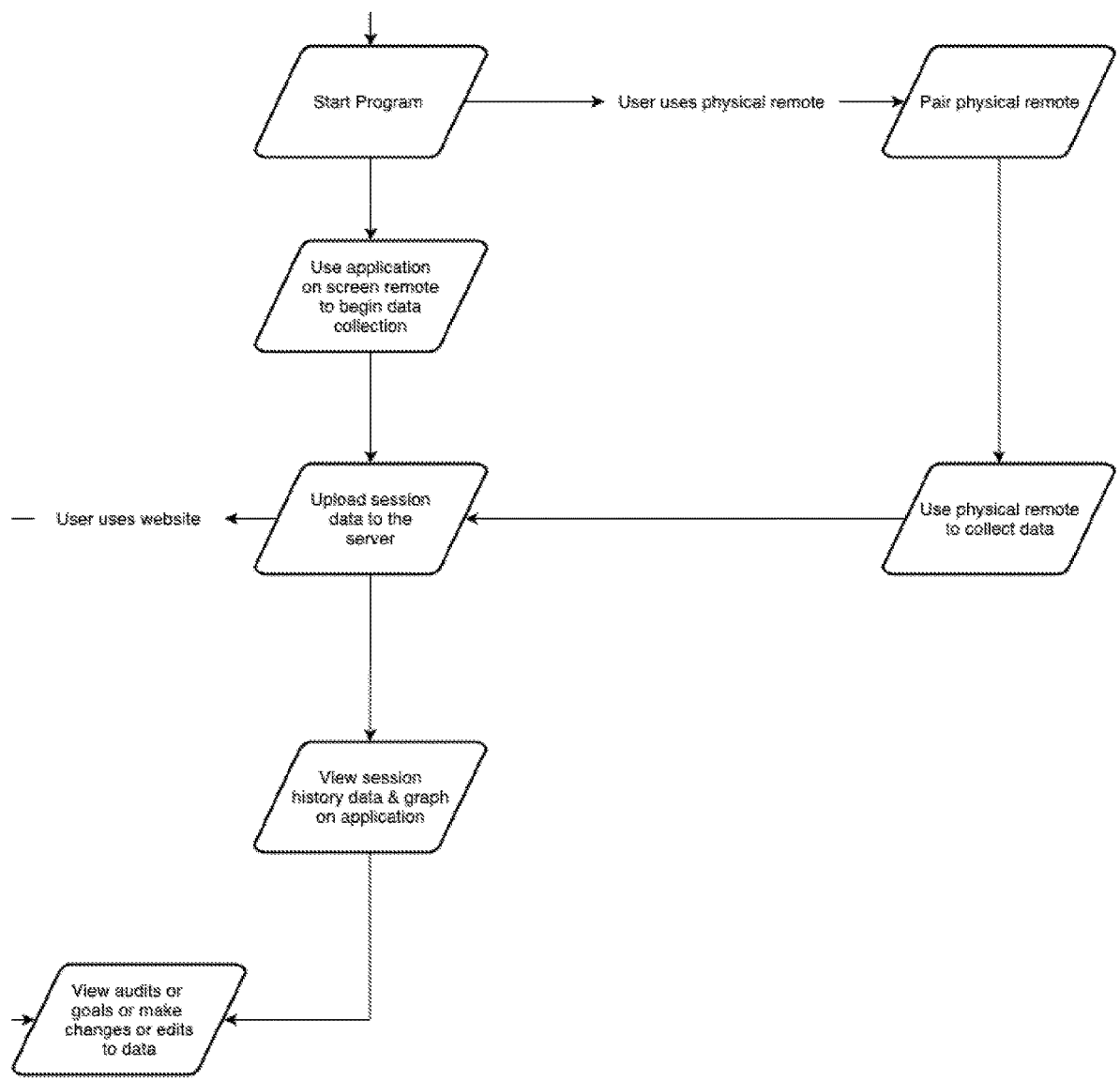
Figure 49:
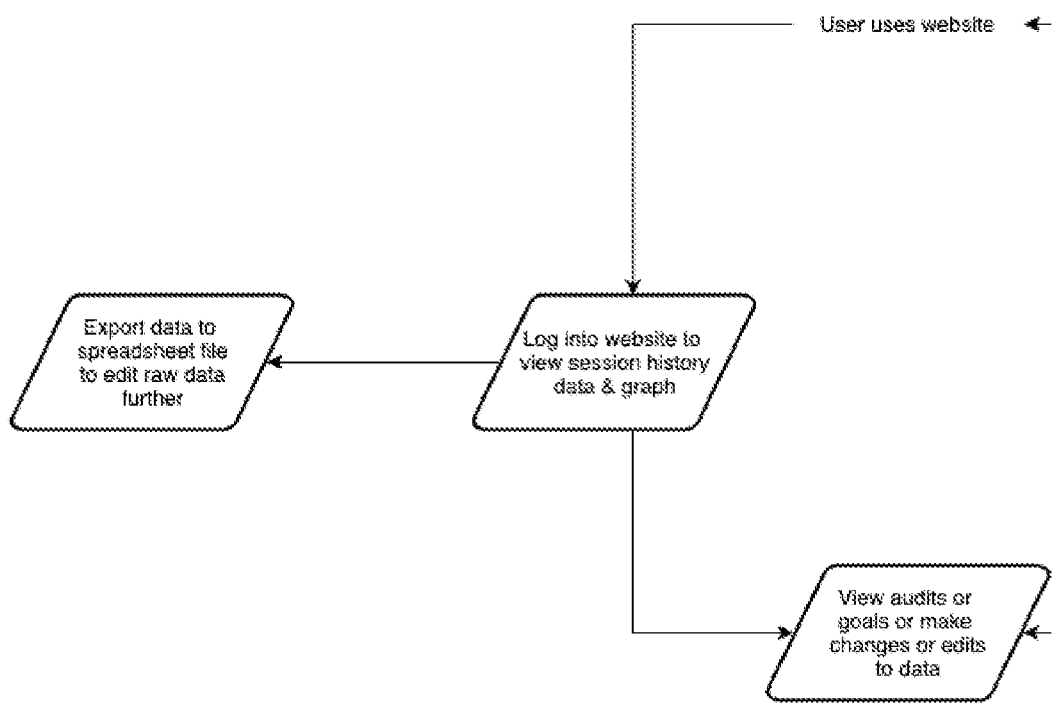

Flowchart 1.0 shows the example of a typical user experience. This is split into three figures to meet size requirements. FIG. 47 displays the beginning steps of a new user in comparison to a continued user. FIG. 48 displays how the user would start a program and utilize either the physical remote or the virtual touch screen remote within the application. After finishing the program, the user will upload it and view the data for the session within the application or the website. FIG. 49 shows the website component the user will interact with.

Figure 50:
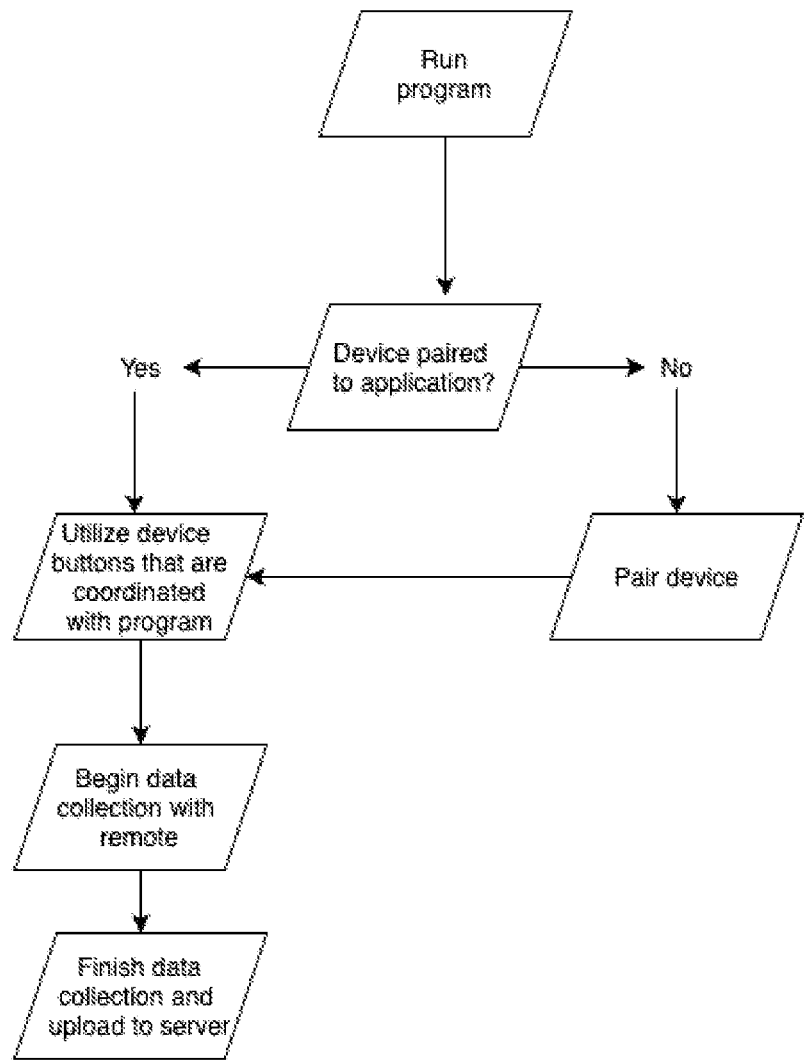

Flowchart 2.0 shown in FIG. 50 demonstrates the process of data collection with the physical remote connected.

Figure 51:
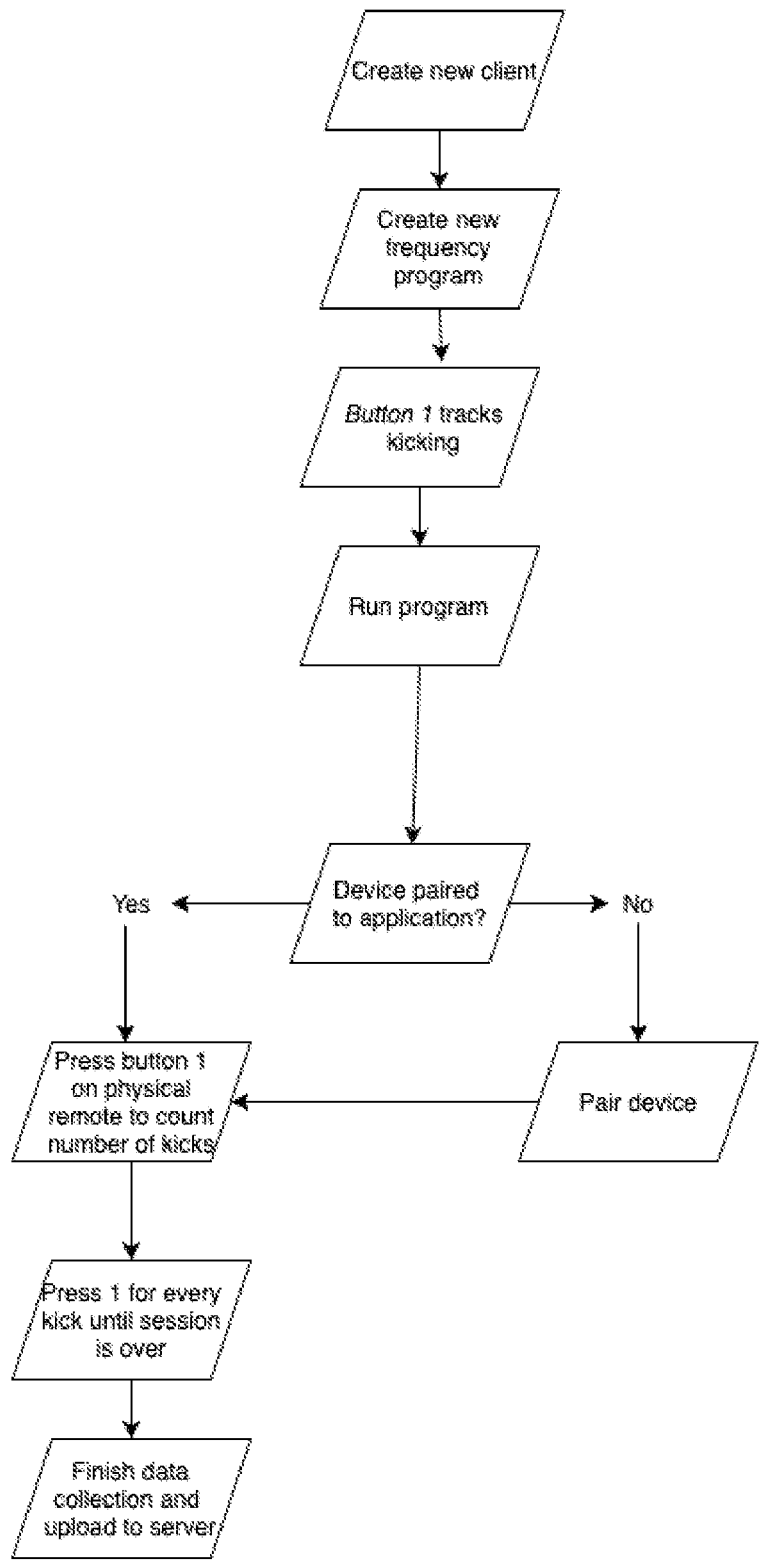

Flowchart 3.0 shown in FIG. 51 displays the example of the user utilizing a behavior tracking program to count the number of kicks that occur within a given session time.

New User Application Walkthrough

Getting Started

FIG. 14 is the home screen and is the first screen the new user will experience when logging into the application. Upon entering valid credentials, the user will be sent to the next screen, FIG. 15, where the user will be able to see all upcoming and recent clients. If the user is new, this screen will be empty. FIG. 16 displays how the new user would create their very first client. After naming the client, the user will then create their first behavior tracking program as seen in FIG. 17. The user will decide the behavior program utilized and fill out the schedule of when the client will be seen. In this example, the user is working with Lou Willis, a client who engages in severe head banging due to a sensory dysregulation. FIGS. 18 and 19 outline the description of the behavior and the measurement type selection, which is count. The user's program will now count each single occurrence of head banging for Lou Willis. FIG. 20 brings the user to their list of clienteles, again if this is a new user, the only client created would have been Lou Willis. Upon clicking Lou Willis, the user will be brought to all of Lou's programs. Since there is currently only one program for Lou Willis, it will display as such in FIG. 21. After starting the behavioral tracking program, the user will now be able to utilize the on screen remote as seen in FIG. 22. Every time Lou Willis engages in head banging, the user will press 1 to record one count of head banging. Once the user finalizes data collection, the user can press the "x" observed on the top right of FIG. 22 screen to save and complete the session, which will then bring you to the "finish session" window in FIG. 23. Upon saving the session, it will add that session to the upload session queue in FIG. 24. The user can now go back to Lou Willis' behavior program and click to view the session documentation and history of this program after it is uploaded, depicted in FIG. 25. The user can continue to track sessions over the period of a couple days and see the graph of Lou's head banging by clicking the graph icon at the top of FIG. 25. This graph is displayed in FIG. 27 as the new user recorded three different sessions for head banging on October $21^{st}$, $22^{nd}$, and $27^{th}$.

Figure 32:
Figure 40:
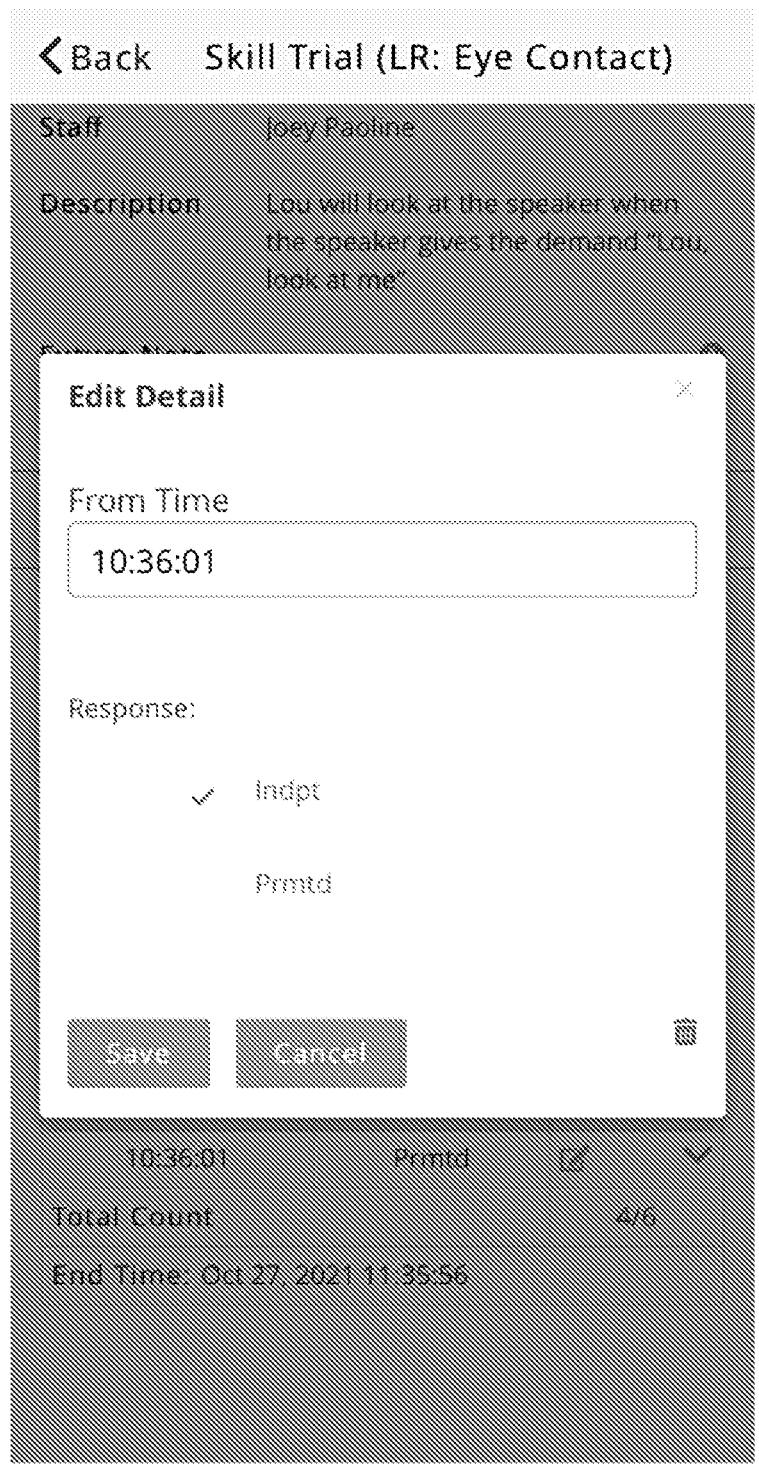

The new user may prefer to record one behavior at a time, however, in most applied cases with clients, the user will have to track multiple behaviors. The user understands this and begins to create a new program by clicking the top right three lines icon in FIG. 31. The new program will be to measure eye contact attempts after calling Lou Willis by his first name, followed by saying, "Lou, look at me", depicted in FIGS. 32 and 33. The user then programs the skill trial by determining which button on the remote will represent a correct and an incorrect response once Lou is asked "look at me." The user will then program his goal criteria and select a mode color for the program as shown at the top of FIG. 34. By returning to Lou Willis' programs, the user can now select multiple programs to run at the same time; displayed in FIGS. 35 and 36. Whenever the user calls Lou by his name and tells him to "look at me," the user will record Louis' response by pressing the appropriate button. "Button 1" will track if Lou immediately looks at the user and "Button 2" will track if Lou is unable to look or needs extra help/prompts to look at the user. The count is then tracked on the screen. The user decides to utilize the note function to document an abnormal response from Lou. Tapping the note icon in the top right of FIG. 36 brings up the window seen in FIG. 37. After the session is completed and the user records head banging behavior along with eye contact responses, the user can follow the same process to end session and upload it from the queue. FIG. 38 displays the skill trial response for Lou looking 4 times out of the total 6 attempts, the session graphs the percentage at 66% (with a gray dot on the y axis). After looking at the data, the user decides if Lou is on track to finish this goal based off the goal criteria indicated in FIG. 34 (50% independence for 3 sessions in a row). FIG. 39 displays the client's progress towards the goal specified. During this example of data collection, the user realizes that an error was made. The user accidently clicked button 2 for an eye contact response instead of button 1. As shown in FIG. 40, the user then goes to edit the original response from prompted (Prmtd) to an independent (Indpt) response which changes the total from 4/6 to 5/6.

Figure 43:
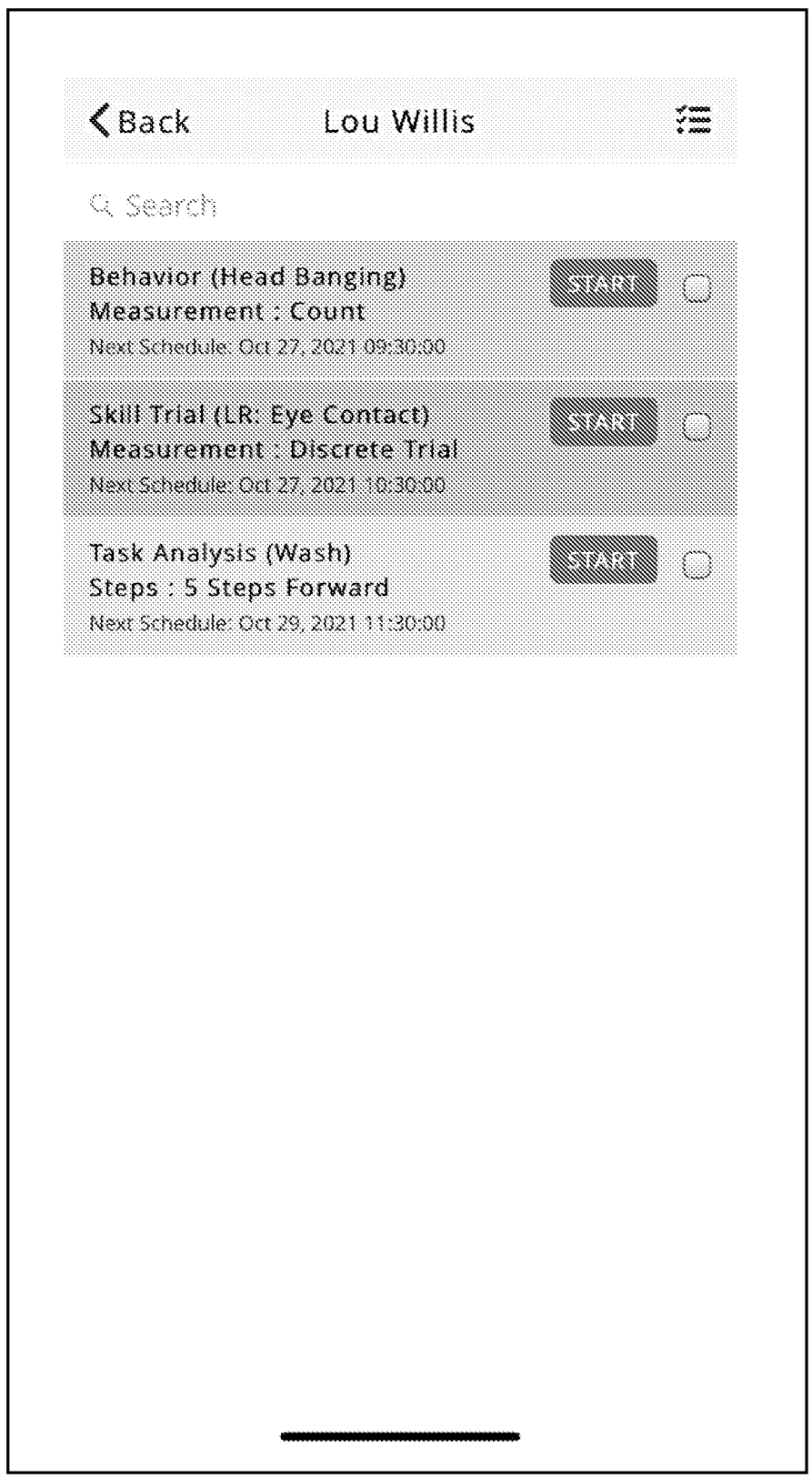
Figure 44:
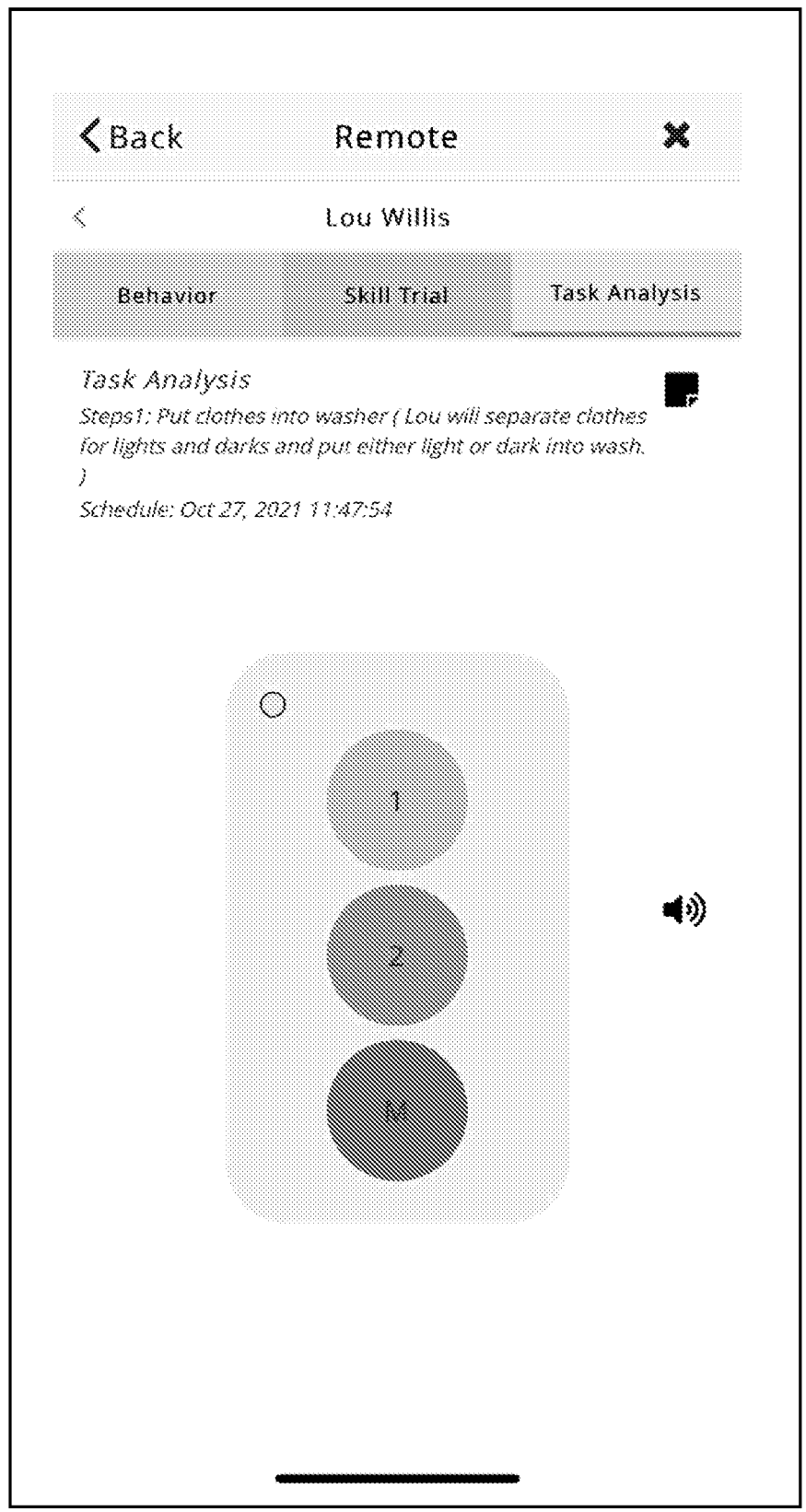

The user finally decides it is time to teach Lou an additional skill inside a vocational setting to build more independent life skills. The user decides it is time to teach Lou a task analysis goal on how to wash clothes, and then creates a new program as shown in FIG. 41. The goal of this program will be to break down the lengthy behavior goal of washing clothes into five smaller steps to collect data on. After indicating the five steps, the user will then name and describe each step, as seen in FIG. 42. Once added, the user can go into Lou's programs and start the new task analysis as seen in FIGS. 43 and 44. As the user answers the steps with a response of button 1 or button 2, it will automatically track and bring up the next step indicated with the behavioral goal. Once the user finishes tracking the data, the session will be uploaded to the server and can be viewed, as shown in FIG. 45. The user will review the data and then authenticate the review by adding a signature, as shown in FIG. 46.

New User Remote Pairing

After getting comfortable with the interface, the new user may decide to pair the Bluetooth remote controller to record session data. Once the user pairs the remote to the application, the user may now utilize the remote as demonstrated in FIG. 26. This is especially useful for the user when counting the frequency of headbanging behavior accurately while simultaneously trying to apply intervention to reduce self-injury or limit the impact done to the client's skull. Traditionally, the user would need to utilize a pen and paper to record these instances which makes implementation an intervention extremely challenging. If the user needs to apply an impact pillow underneath the client's head, using the pen and paper route, or even using an iPad could be rather challenging.

New User Website Access & Exporting

During the new users' journey within the application, there may be a time where it is more appropriate to access the website, as seen in FIG. 28. The user could determine that viewing Lou Willis' head banging count within the application is a helpful guide, but now the user wants to export it into an alternative spreadsheet application for further graphing edits and analysis of the data. The user opens Lou Willis' self-injury head banging report online (FIG. 29) and clicks on the "Report" button which saves the file into spreadsheet format. Since the user has now saved the report on their computer, it will now open as a spreadsheet as seen in FIG. 30. The user can now see the behavior counts for each session date and time, along with notes, all within the spreadsheet application Microsoft Excel.

Additional Considerations

1. Input Modalities

Once the hardware device that is executing the application is paired with the physical remote input device, the software code in the application allows information regarding human behavior to be recorded for the program using input signals generated during the session. In one preferred embodiment, the input signals may be generated by selecting buttons on the physical remote input device (remote). In another preferred embodiment, the input signals may be generated by selecting buttons on the virtual remote display screen (virtual screen). In yet another preferred embodiment, the input signals may be generated by using a combination of button selections on the physical remote device and button selections on the virtual remote display screen. That is, some input signals may be entered using the physical remote device, whereas other signals may be entered using the virtual remote display screen. The application treats either input as being acceptable.

Consider, for example, the following scenario for a particular program wherein button 1 on the virtual screen was previously assigned to button X on the remote, and button 2 on the virtual screen was previously assigned to button B on the remote. Also, for the particular program that information is being recorded, button 1 on the virtual screen was previously assigned to indicate that a subtask (step) of a task was completed, and button 2 on the virtual screen was previously assigned to indicate that a subtask (step) of a task was not completed. Due to the pairing of the remote, the remote button X may be used to indicate that a step was completed, and the remote button B may be used to indicate that a step was not completed. In this example, a task to be completed by a client has four subtasks (steps), and the user will record one response (either "completed" or "not completed") for each step. By accepting input signals from either the virtual screen or the remote, the user is provided with enhanced flexibility compared to being limited to only one input device. For example, the user may find it easier to use the virtual screen when recording the client's response to the first and second steps, but the user may find it easier to use the remote when recording the client's response to the third and fourth steps. For example, the remote allows for response entry in a much more discrete manner than entering responses on a display screen of the hardware device which requires looking away from the client. Each time a response is entered, indicating either "completed" or "not completed." the program automatically advances to the next step and waits for the next response input from the user. For the example described above, the response inputs may be as shown in Table 1 below:

TABLE 1

| step | input | Program interpretation |
| --- | --- | --- |
| 1 | button 1 of virtual screen | step 1 was completed |
| 2 | button 2 of virtual screen | step 2 was not completed |
| 3 | button X of remote | step 3 was completed |
| 4 | button B of remote | step 4 was not completed |

Similarly, if a timer function (time period) is being used for a program, the timer may be started using the virtual screen and stopped using the remote, or vice-versa.

2. Mode Button

As discussed above, the mode button allows for a plurality of different programs to be selected. Once the virtual mode button is paired with a remote button, either the virtual mode button or the remote button may be used to select the program.

The present invention is preferably implemented in software code which can be executed on any suitable processor or collection of processors, whether provided in a single computer or distributed among multiple computers. One preferred embodiment of the software code is shown in the Appendix. As discussed above, the Appendix includes Parts 1-20, which are individually referenced above.

The present invention can also be included in an article of manufacture (e.g., one or more tangible computer program products) having, for instance, non-transitory computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

As explained above, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

Various embodiments of the invention have been presented above. However, the invention is not intended to be limited to the specific embodiments presented, which have been presented for purposes of illustration. Those skilled in the art, having the benefit of the teachings of this specification, may make numerous modifications without departing from the scope and spirit of the invention in its various aspects.

What is claimed is:

1. A method for synchronizing a virtual remote display screen of an application executing on a hardware device with a physical remote input device, wherein the application is configured to record information regarding human behavior for a program, and wherein the synchronization allows the information regarding human behavior to be recorded during a session by using either the virtual remote display screen or the physical remote input device, or a combination of both the virtual remote display screen and the physical remote input device, and wherein the virtual remote display screen includes a plurality of virtual buttons, each virtual button having a unique virtual label, and wherein the physical remote input device includes a plurality of physical buttons, each of the buttons having a unique physical label that is used to identify the respective button, the method comprising:
(a) electronically pairing the hardware device that is executing the application with the physical remote input device; and
(b) programming for the program, via one or more configuration display screens of the application, a plurality of the virtual buttons to be associated with a plurality of physical buttons in a one-to-one correspondence by:
(i) selecting a virtual button on the virtual remote display screen,
(ii) selecting a physical button on the physical remote input device to be associated with the selected virtual button,
(iii) repeating steps (i) and (ii) for one or more additional virtual buttons on the virtual remote display screen, and
(iv) storing the associations made between the virtual buttons and the physical buttons,
thereby associating each virtually labeled virtual button with a unique physically labeled button for the program so that the information regarding human behavior to be recorded for the program may be inputted during the session by using either the virtual remote display screen or the physical remote input device, or a combination of both the virtual remote display screen and the physical remote input device; and
(c) programming software code executed by the application to allow the information regarding human behavior to be recorded for the program using input signals generated during the session by either the virtual buttons on the virtual remote display screen or the physical buttons on the physical remote input device, or a combination of both the virtual buttons on the virtual remote display screen and the physical buttons on the physical remote input device.

2. The method of claim 1 wherein the program records information regarding whether or not a person completed a task, one of the virtual buttons and the respectively associated physical button being configured to record whether the person completed the task, and another one of the virtual buttons and the respectively associated physical button being configured to record whether the person did not complete the task.

3. The method of claim 1 wherein the program records information regarding whether or not a person exhibited a desired behavior, one of the virtual buttons and the respectively associated physical button being configured to record whether the person exhibited the desired behavior, and another one of the virtual buttons and the respectively associated physical button being configured to record whether the person did not exhibit the desired behavior.

4. The method of claim 1 wherein the program records information regarding whether or not a person has made a correct response to a stimulus, one of the virtual buttons and the respectively associated physical button being configured to record whether the person has made the correct response to the stimulus, and another one of the virtual buttons and the respectively associated physical button being configured to record whether the person has not made the correct response to the stimulus.

5. The method of claim 1 wherein the program records information regarding a time period associated with a behavior exhibited by a person, one of the virtual buttons and the respectively associated physical button being configured to record a start time of the behavior exhibited by the person, and another one of the virtual buttons and the respectively associated physical button being configured to record a stop time of the behavior exhibited by the person.

6. A method for synchronizing a virtual remote display screen of an application executing on a hardware device with a physical remote input device, wherein the application is configured to record information regarding human behavior for a plurality of different programs, each program having its own information regarding human behavior to be recorded, and wherein the synchronization allows the information regarding human behavior to be recorded during a session by using either the virtual remote display screen or the physical remote input device, or a combination of both the virtual remote display screen and the physical remote input device, and wherein the virtual remote display screen includes a plurality of virtual buttons, each virtual button having a unique virtual label, and wherein the physical remote input device includes a plurality of physical buttons, each of the buttons having a unique physical label, the method comprising:
   (a) electronically pairing the hardware device that is executing the application with the physical remote input device;
   (b) selecting one of the plurality of different programs;
   (c) programming for the selected program, via one or more configuration display screens of the application, a plurality of the virtual buttons to be associated with a plurality of physical buttons in a one-to-one correspondence by:
      (i) selecting a virtual button on the virtual remote display screen,
      (ii) selecting a physical button on the physical remote input device to be associated with the selected virtual button,
      (iii) repeating steps (i) and (ii) for one or more additional virtual buttons on the virtual remote display screen, and
      (iv) storing the associations made between the virtual buttons and the physical buttons;
   (d) selecting at least one additional program and repeating step (c) for the additional selected program, thereby associating each virtually labeled virtual button with a unique physically labeled button for the respective program so that the information regarding human behavior to be recorded for a selected program may be inputted during the session by using either the virtual remote display screen or the physical remote input device, or a combination of both the virtual remote display screen and the physical remote input device; and
   (e) programming software code executed by the application to allow the information regarding human behavior to be recorded for the respective programs using input signals generated during the session by either the virtual buttons on the virtual remote display screen or the physical buttons on the physical remote input device, or a combination of both the virtual buttons on the virtual remote display screen and the physical buttons on the physical remote input device.

7. The method of claim 6 wherein one of the programs records information regarding whether or not a person completed a task, one of the virtual buttons and the respectively associated physical button being configured to record whether the person completed the task, and another one of the virtual buttons and the respectively associated physical button being configured to record whether the person did not complete the task.

8. The method of claim 6 wherein one of the programs records information regarding whether or not a person exhibited a desired behavior, one of the virtual buttons and the respectively associated physical button being configured to record whether the person exhibited the desired behavior, and another one of the virtual buttons and the respectively associated physical button being configured to record whether the person did not exhibit the desired behavior.

9. The method of claim 6 wherein one of the programs records information regarding whether or not a person has made a correct response to a stimulus, one of the virtual buttons and the respectively associated physical button being configured to record whether the person has made the correct response to the stimulus, and another one of the virtual buttons and the respectively associated physical button being configured to record whether the person has not made the correct response to the stimulus.

10. The method of claim 6 wherein one of the programs records information regarding a time period associated with a behavior exhibited by a person, one of the virtual buttons and the respectively associated physical button being configured to record a start time of the behavior exhibited by the person, and another one of the virtual buttons and the respectively associated physical button being configured to record a stop time of the behavior exhibited by the person.

11. The method of claim 6 wherein one of the plurality of virtual buttons is a virtual mode button that is configured to select one of the plurality of different programs, wherein each button activation cycles through the programs, and wherein the method further comprises:
   (f) programming, via the one or more configuration display screens of the application, the virtual mode button to be associated with a physical button in a one-to-one correspondence by:
      (i) selecting the virtual mode button on the virtual remote display screen, and
      (ii) selecting a physical button on the physical remote input device to be associated with the virtual mode button,
      wherein the selection of one of the plurality of different programs may be made during the session by using either the virtual mode button or the physical button that was previously associated with the virtual mode button.

12. The method of claim 6 wherein prior to step (a), the method further comprises:
  (f) assigning for each program a plurality of the virtual buttons to be associated with respective information regarding human behavior to be recorded, each program having its own information regarding human behavior to be recorded,
    wherein the assigned plurality of virtual buttons for each program are the same buttons programmed to be associated with the physical buttons.

13. A method for synchronizing a virtual remote display screen of an application executing on a hardware device with a physical remote input device and using one or both of the virtual remote display screen and the physical remote input device via the application to record information regarding human behavior for a program, and wherein the synchronization allows the information regarding human behavior to be recorded during a session by using either the virtual remote display screen or the physical remote input device, or a combination of both the virtual remote display screen and the physical remote input device, and wherein the virtual remote display screen includes a plurality of virtual buttons, each virtual button having a unique virtual label, and wherein the physical remote input device includes a plurality of physical buttons, each of the buttons having a unique physical label that is used to identify the respective button, the method comprising:
  (a) electronically pairing the hardware device that is executing the application with the physical remote input device;
  (b) programming for the program, via one or more configuration display screens of the application, a plurality of the virtual buttons to be associated with a plurality of physical buttons in a one-to-one correspondence by:
    (i) selecting a virtual button on the virtual remote display screen,
    (ii) selecting a physical button on the physical remote input device to be associated with the selected virtual button,
    (iii) repeating steps (i) and (ii) for one or more additional virtual buttons on the virtual remote display screen, and
    (iv) storing the associations made between the virtual buttons and the physical buttons,
  thereby associating each virtually labeled virtual button with a unique physically labeled button for the program so that the information regarding human behavior to be recorded for the program may be inputted during the session;
  (c) programming software code executed by the application to allow the information regarding human behavior to be recorded for the program using input signals generated during the session by either the virtual buttons on the virtual remote display screen or the physical buttons on the physical remote input device, or a combination of both the virtual buttons on the virtual remote display screen and the physical buttons on the physical remote input device; and
  (d) recording the information regarding human behavior during the session by selecting appropriate virtual buttons on the virtual remote display screen or appropriate physical buttons on the physical remote input device, wherein the button selection may be made using either the virtual remote display screen or the physical remote input device, or a combination of both the virtual remote display screen and the physical remote input device, and
  wherein during the session the physical remote input device is in proximity to the hardware device to allow the paired physical remote input device to communicate with the application executing in the hardware device.

14. The method of claim 13 wherein the program records information regarding whether or not a person completed a task, one of the virtual buttons and the respectively associated physical button being configured to record whether the person completed the task, and another one of the virtual buttons and the respectively associated physical button being configured to record whether the person did not complete the task.

15. The method of claim 13 wherein the program records information regarding whether or not a person exhibited a desired behavior, one of the virtual buttons and the respectively associated physical button being configured to record whether the person exhibited the desired behavior, and another one of the virtual buttons and the respectively associated physical button being configured to record whether the person did not exhibit the desired behavior.

16. The method of claim 13 wherein the program records information regarding whether or not a person has made a correct response to a stimulus, one of the virtual buttons and the respectively associated physical button being configured to record whether the person has made the correct response to the stimulus, and another one of the virtual buttons and the respectively associated physical button being configured to record whether the person has not made the correct response to the stimulus.

17. The method of claim 13 wherein the program records information regarding a time period associated with a behavior exhibited by a person, one of the virtual buttons and the respectively associated physical button being configured to record a start time of the behavior exhibited by the person, and another one of the virtual buttons and the respectively associated physical button being configured to record a stop time of the behavior exhibited by the person.

* * * * *